United States Patent [19]

Kapp et al.

[11] Patent Number: 4,733,310
[45] Date of Patent: Mar. 22, 1988

[54] PAPER SHEET AND ENVELOPE FEEDER APPARATUS

[75] Inventors: Ludwig J. Kapp, Blairstown; Dominick Fazio, Whippany; Mark Crowley, Mine Hill, all of N.J.

[73] Assignee: Ziyad, Inc., Denville, N.J.

[21] Appl. No.: 866,881

[22] Filed: May 23, 1986

[51] Int. Cl.⁴ .............................................. H04N 1/23
[52] U.S. Cl. ................................. 358/300; 355/14 SH
[58] Field of Search ............................. 358/296, 300; 355/14 SH, 3 SH; 271/1, 2

[56] References Cited

U.S. PATENT DOCUMENTS 4,522,382 6/1985 Chu et al. ............................. 271/2 X
4,551,009 11/1985 Shigemura et al. ......... 355/14 SH X Primary Examiner—Clifford C. Shaw
Attorney, Agent, or Firm—Lerner, David, Littenberg, Krumholz & Mentlik

[57] ABSTRACT

There is disclosed a paper feeder apparatus attached to a printer or other device. The paper feeder apparatus employs two trays each of which are capable of accommodating papers of different sizes and an envelope tray for accommodating envelopes. The feeder is controlled by a host computer of the type capable of generating feeder and printer control commands. These commands are transmitted to control logic associated with the paper feeder which control logic is under control of a microprocessor. The microprocessor assumes complete control of the entire paper feed mechanism and communication to the printer. Thus, the microprocessor operates two motors associated with the paper feed path. A first motor is operated so that a sheet of paper can be withdrawn from either of the two trays and then transported along a paper path. A sensor in conjunction with the path determines the exact position of the paper which then causes the microprocessor to actuate a second drive motor to assure that the paper is brought into the vicinity of the printer input slot. The microprocessor, as indicated, performs all control functions as driving motors and operating solenoids to assure that a proper feed operation occurs. The microprocessor also has means for monitoring the temperature of the motors to assure that they are operating in a proper temperature range. The microprocessor also receives inputs from each of the trays to determine whether or not paper is being accommodated by the trays and to receive further inputs indicative of the status of the various sensors which are utilized to monitor the path of the paper or the envelope as it is directed towards the operating input slot of the printer. The microprocessor is also programmed to perform threshold tests whereby the sensors associated with each of the different paths as the paper path and the envelope path are tested in regard to ambient light so that a new threshold level is set for the sensor prior to a paper load or envelope load operation. In this manner, the sensors always exhibit a maximum response and therefore enable the paper feeder to accommodate different quality papers of different colors, different tones and different reflecting surfaces.

20 Claims, 11 Drawing Figures

PAPER SHEET AND ENVELOPE FEEDER APPARATUS

BACKGROUND OF THE INVENTION

This invention relates to paper feeder apparatus and more particularly to a paper and envelope feeder apparatus for use with a printer or copier.

Paper feeders are widely employed and utilized as adjunct equipment to printers and copy machines. As is well known, many modern copy machines and printers have the ability to accommodate different sizes of paper by employing multiple trays or multiple feed mechanisms. In any event, many such machines do not provide the capability of changing paper size without difficult mechanical maneuvers. For example, in certain printers and copy machines, there is employed a single paper tray whereby a stack of papers of one size can be accommodated and utilized during the printing process. In the case of such machines, in order to change the size of the paper, the tray has to be removed with a new stack of papers of the requisite size placed in the tray. This, of course, is a relatively time consuming process.

In the case of other printers or copy machines these may include two or more trays, each one of which is adapted to accommodate different size paper and the particular size would be selected by the user during a printing or copying procedure. In any event, a great many printers are available on the market which do not have the capability of accommodating different paper sizes. Many prior art machines also include an input slot for feeding a single sheet of paper at a time. Hence, the prior art cognizant of these problems provided separate apparatus generally designated as paper feeders and which feeders were adapted to automatically feed paper into the printer or copier from one or more additional locations or trays which were associated with the paper feeder.

For examples of such apparatus, reference is made to U.S. Pat. No. 4,326,815 entitled Paper Feeding Apparatus and Method for Printing Apparatus issued on Apr. 27, 1982 to L. J. Kapp and assigned to the assignee herein. See also U.S. Pat. No. 4,407,597 entitled Paper Feeding Apparatus by L. J. Kapp and also assigned to the assignee herein.

Presently, there are printers which utilize a laser to perform a printing task. These printers are manufactured by different companies and as indicated are generally referred to as laser printers. The laser printer utilizes a drum upon which a raster scanning laser beam is directed, which laser beam writes an image on the photoconducting drum. The generated pattern then picks up particles of toner and transfers them to paper. Laser printers as provided by typical manufacturers normally have a paper feed mechanism which allows the user to insert paper into a slot or direct paper from a tray so that the paper is then utilized by the printer to furnish the hard copy. An example of such a laser printer is manufactured by the Canon Company and sold under the designation as the Canon LBP/CX. Other companies such as Hewlett Packard of Palo Alto, Calif., manufacture such a printer which is designated as the LaserJet. These are example of companies that manufacture laser printers and which printers are available for commercial sale.

In any event, as indicated above, a typical problem that exists with such printers is that these printers are normally associated with a single tray which can only accommodate one particular size of paper and in order to implement a paper change, the tray would have to be removed, a new stack of paper inserted into the tray, and then the tray is replaced to accommodate a different size paper. This particular problem is the type of problem described above and exists in regard to many commercially available printers and copiers. Apart from this consideration is the further factor that many of these printers as well as copiers are not capable of handling or accommodating envelopes. Such printers have the ability to print out addresses and other data which would be normally included on an envelope. Hence, a device for providing the automatic feeding of envelopes into a printer or copier mechanism is an extremely desirable feature. Thus, it is a desire to provide a paper and envelope feeder which is specifically designed to feed cut paper sheets and envelopes into a printer or a copier without modifying the basic printer or copier apparatus. The apparatus should be simple in structure and be completely compatible with the requirements, operating characteristics and paper handling capability of the associated printer or copier. The apparatus to be described provides two input paper trays, an input envelope tray and an output stacker as well as an access path to the paper feed slot of a commercially available laser printer. It is an object of the present invention to allow the printer to remain fully functional and capable of normal operation while utilizing the present apparatus. Hence, the additional feeder apparatus which is the subject matter of this invention does not interfere with normal printer operation while giving the printer the ultimate capability of utilizing different input paper trays as well as an envelope tray. The apparatus to be described is situated under the printer and essentially the printer mounts on and is supported by the apparatus to provide easy maintenance and optimum use. The entire paper feeder is controlled by means of a microcomputer or microprocessor unit. The microcomputer controls the drive units and mechanical controls while providing an interface between the paper feeder and the printer being utilized. The computer control mechanism includes paper path and envelope path sensors which are coupled directly to inputs of the micro computer to allow the unit to control the entire feed apparatus in an efficient and reliable manner.

DESCRIPTION OF PREFERRED EMBODIMENT

Apparatus for selectively feeding paper to a printer, said printer of the type capable of printing indicia on said paper with said printer having control means capable of receiving and transmitting control symbols indicative of the state of said printer as a busy state when printing an idle state when ready to print, said printer having an input area or seat for receiving a sheet of paper, comprising:

a plurality of storage trays each adapted to store paper of a given size; paper drive means for directing a sheet of paper as selected from one of said storage trays to said slot along a predetermined paper path, said paper drive means including a first drive and a second drive motor each operative as controlled to direct said sheet of paper along said path; sensing means disposed in said path and operative to sense the position of said paper sheet as directed along said path with said sensing means operative to sense the leading edge of said paper in a first position to provide a first signal and to sense the trailing edge of said paper in a second position to provide a second signal;

first means coupled to said first drive motor and operative to drive said paper to said first position and means responsive to said first control signal to operate said second motor drive during the presence of said first control signal to cause said sheet to continue to move along said path, means responsive to said second control signal to continue to operate said second drive motor for a predetermined period indicative of said paper sheet being positioned at said input area.

DETAILED DESCRIPTION OF FIGURES

Figure 1:
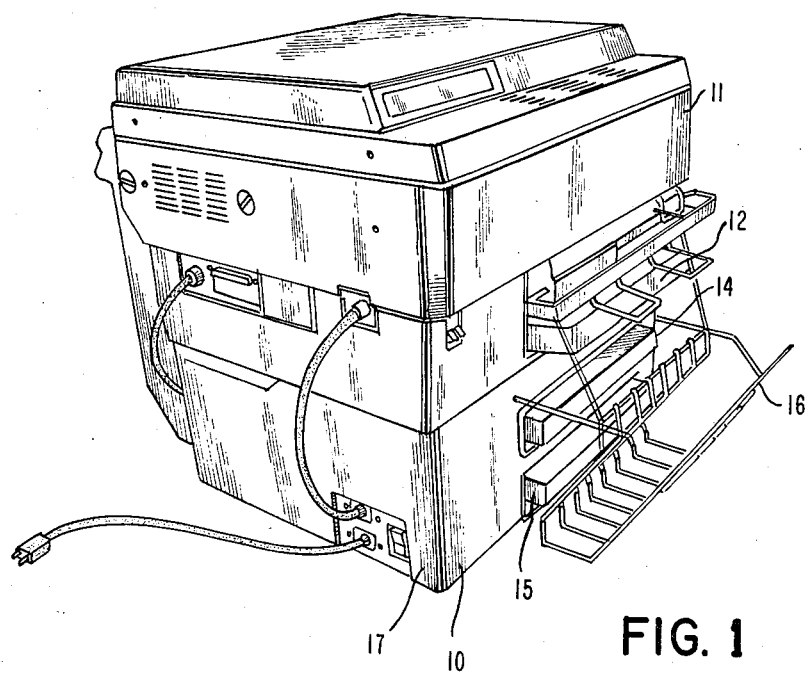
FIG. 1 is a front perspective view showing a paper feeder apparatus housing in conjunction with a printer according to this invention.

Referring to FIG. 1, there is shown a front view of a paper feeder as a sheet and envelope feeder 10 upon which is positioned a printer 11. Essentially, the printer 11 may be a laser printer such as the type manufactured by Canon USA Inc. of One Canon Plaza, Lake Success, N.Y. 11042 and designated by Canon as the LBP-CX. As can be seen from FIG. 1, the printer 11 is positioned above and is supported by the sheet and envelope feeder 10. As will be explained, the printer includes its own paper tray 12 which essentially allows a user to stack sheets of paper within tray 12 to allow the paper to be utilized by the printer during the printing process. The sheet and envelope feeder apparatus 10 comprises an upper paper tray 14, a lower paper tray 15 and an output stacker mechanism 16 all associated wth a common housing 17. As will be explained, the purposes of the upper and lower paper trays 14 and 15 is to hold cut sheet paper to enable sheet paper to be fed directly into the printer during a printing operation and as controlled by the apparatus according to the particular mode selected.

Figure 2:
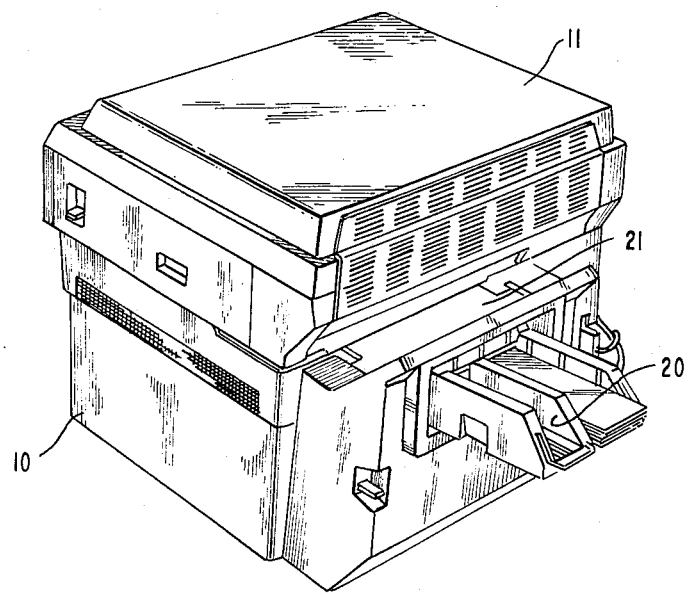
FIG. 2 is a rear perspective view of the feeder apparatus accommondating a printer.

Referring to FIG. 2, there is shown a rear perspective view of the mechanism depicted in FIG. 1. As again indicated in FIG. 2, the printer 11 sits on the top surface of the sheet and envelope feeder 10. The sheet and envelope feeder 10 also includes an output envelope tray 20 to enable one to utilize and to feed envelopes into the printer 11 as will be explained. There is also a manual feed chute or slot associated with the printer 11 which has been designated by reference numeral 21.

Figure 3:
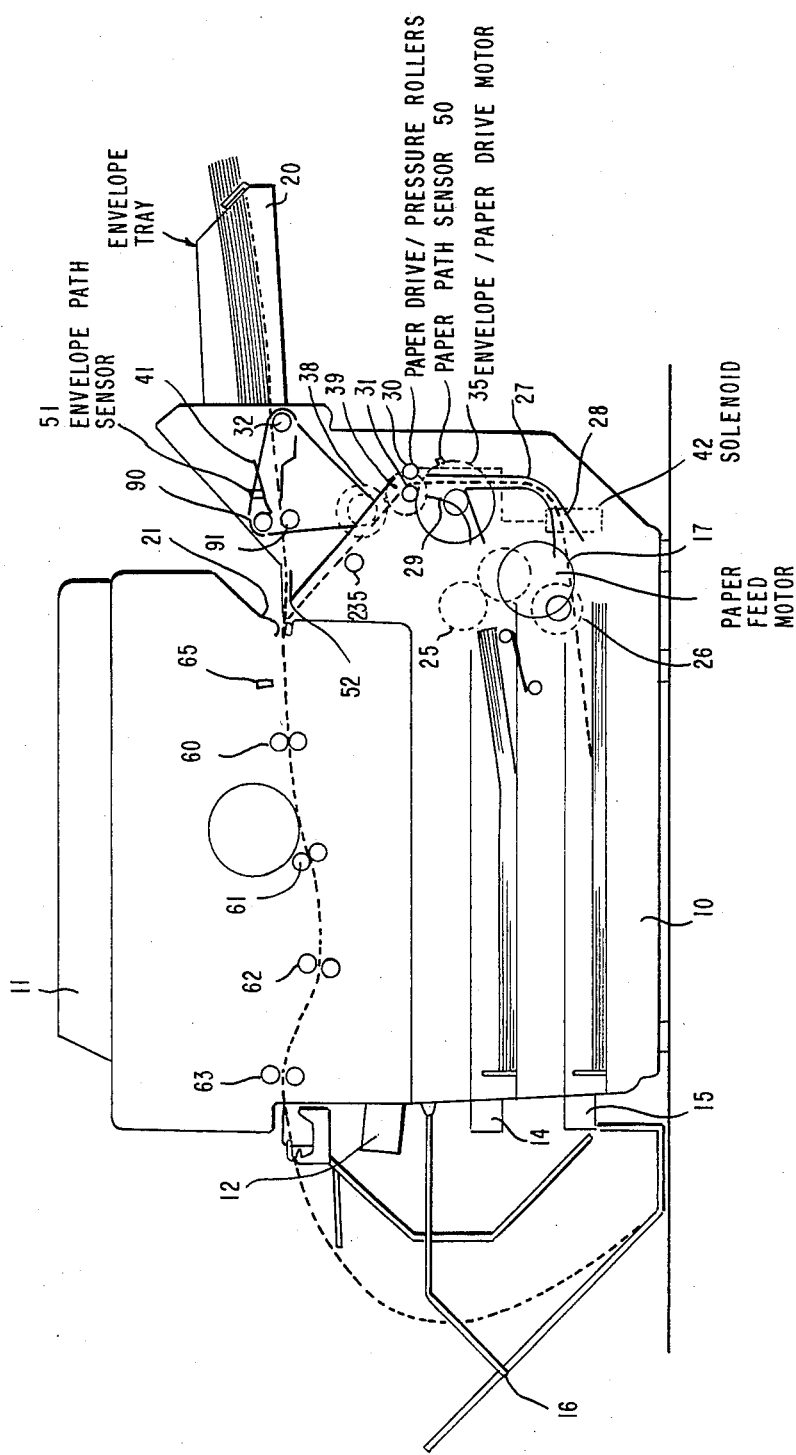
FIG. 3 is a schematic view showing the paper and envelope feed path which is implemented by the apparatus.

Referring to FIG. 3, there is shown a functional diagram depicting the basic paper path which is provided by the sheet and envelope feeder apparatus. As seen from FIG. 3, the upper paper tray 14 and lower paper tray 15 each are accommodated in the feeder apparatus 10 by means of elongated slots in the housing 17 into which the paper trays are inserted. The paper trays slide in and out of the front of the unit 10. Each tray may accommodate up to 175 sheets of twenty-pound paper. It is of course understood that other paper weights can be accommodated as well. The trays can be adjusted to accommodate typical size papers as $8\frac{1}{2} \times 11$, $8\frac{1}{2} \times 13$ and so on. Each tray has corner strippers at the front of the tray which separate each sheet as it is pulled from the tray. Springs in the feeder mechanism exert upward pressure on the paper against the drive rolls and microswitches indicate the paper out conditions for each tray. This is a relatively conventional approach. In any event, as can be seen from FIG. 3, tray 14 is associated with a paper drive roller 25. Tray 15 is associated with a paper drive roller 26. Both drive rollers 25 and 26 are caused to rotate or are driven from a paper feed motor 17. The paper feed motor 17 has a central shaft which is coupled by means of a suitable roller to paper drive roller 25. Paper drive roller 26 can be activated directly from the paper feed motor 17 or alternatively can be coupled to the paper feed motor by means of suitable gears or pressure rollers. Positioned in front of trays 14 and 15 and hence positioned in front of the paper path is a feed manifold 27. The feed manifold 27 has a first input port 28 which accommodates a sheet of paper from tray 15 as directed into the input port 28 via the pressure roller 26. An input port 29 associated with manifold 27 in a similar manner receives a paper sheet from tray 14 which is directed into the input port of the manifold 27 via the pressure roller 25. The paper is then directed upwardly or in the vertical direction by means of two or more pressure rollers as 30 and 31. The pressure rollers 30 and 31 are essentially driven by means of a second motor which is designated as an envelope/paper drive motor 35. Activation of the motor 35 causes a sheet of paper from a selected tray 14 or 15 to be directed into the printers manual feed slot 21 via the rollers 31 and 30. Thus, the sheet of paper is directed via an idler roller 235 into and guide 52 the printer slot 21. The envelope tray 20 which contains a stack of envelopes is also positioned to direct envelopes from the stack into the printer's manual feed slot 21. As seen from FIG. 3, the envelope paper path includes envelope drive pressure rollers as 90 and 91 which are positioned in front of the printer's manual feed slot 21 and which rollers are driven by the drive motor 35 via a series of coupling gears or rollers as 38 and 39. These gears cause an envelope to be directed through the envelope manifold 41 and hence via the pressure rollers 90 and 91 where the envelope is then introduced into the manual printing slot 21. Prior to introduction of the envelope to the manual feed slot 21, the envelope rides on a elongated platen to assure that it is introduced into the manual printer slot 21 in proper orientation.

There are also a series of devices which are depicted in FIG. 3 which as, will be explained, operate to synchronize movement along the above-mentioned paper paths. Thus, as shown in FIG. 3, there is a solenoid 42 which as will be explained is activated during operation to assure proper feed to the printer 11. As one can see from the functional diagram of FIG. 3, the paper path as well as the envelope path are depicted in dashed lines. Thus, as one can see, both the paper emanating from trays 14 and 15 as well as an envelope which is positioned in tray 20 are all directed into the printer's manual feed slot 21. Once the item is directed and positioned within the printer's manual feed slot 21, the drive mechanism of the printer then takes control. Normally, such printers have a series of rollers such as rollers 60, 61, 62 and 63 which will then take a piece of paper, inserted into the manual feed slot 21 and direct it in the normal course through the printer's feeding mechanism. The above-described sheet and envelope feeder 10 operates to direct paper from one of two trays as trays 14 or 15 or to direct an envelope directly into the normal manual feed slot 21 associated with the printer. The paper then traverses the path as indicated by the dashed lines and is deposited into the output stacker 16. The output stacker 16 is mounted to the front of the printer 11 in place of the original supporting mechanism. The stacker can pivot up and away from the front of the unit allowing access to all paper trays. The stacker 16 hangs down below the output chute of the printer and sheets drop face down collated in order in the output stacker 16. In a typical application, the stacker can hold up to 300 sheets of twenty-pound paper. As will be explained, the basic operation is as follows. Upon the direction from the control circuit built into the feeder 10, the feeder will feed sheets and envelopes into the printer based on the paper path shown in dashed lines in FIG. 3. Each sheet is fed from one of two paper trays as 14 and 15 which are positioned below the printer. The paper path and the mechanism depicted in FIG. 3 causes the paper to be turned 180 degrees and presented to the printer's manual feed slot 21. The envelope is fed directly into the printer's manual feed slot 21 via the path as containing the pressure rollers 90 and 91. The feeder controller system associated with the feeder apparatus 10 drives and monitors the complete electronics for the feeder apparatus. The motors as motors 17 and 35 provide the drive for the various rollers which are associated with the paper paths. One motor, for example, the paper feed or tray motor 17 feeds paper from either of the two paper trays and approximately does this halfway through the paper path. The second motor which is the envelope/paper drive motor 35 either feeds paper the remaining distance to the manual feed slot 21 of the printer or feeds an envelope from the tray 20 directly into the manual feed slot 21. The communication with the electronics in the feeder apparatus is accomplished via established control signals in accordance with the operating characteristics of the printer as will be explained. Additionally, various status conditions which are typically found in paper feed systems such as paper out, paper jam and so on are reported to the printer control electronics via the interface to be described. Thus, in order to properly monitor the progress of the paper as it is being fed from the feeder 10, the paper feeder path includes a paper path sensor 50 which monitors the path of the paper before it is controlled by the action of the envelope paper drive motor 35. There is also a sensor 51 which is associated with the envelope path and that sensor as seen from FIG. 3 is located before pressure rollers 90 and 91. As will be explained, the above-described apparatus which is the sheet and envelope feeder 10 normally can operate in three particular modes. One mode will be referred to as the sheet feeding automatic mode. In this mode, signals from the electronics contained in the feeder apparatus direct the feeder to initiate a feed from a specified tray such as from tray 14 or 15. This will be accomplished if the tray contains paper. In order to implement this action, the paper feed motor 17 is activated thereby feeding one sheet from the tray selected through the strippers and into the guides as guide 29 and 28 associated with the manifold. The paper path sensor 50 senses the paper's progress and sends a signal to the microprocessor to control the drive rollers as rollers 25 and 26. The paper feed rollers continue to turn until a slight buckle is generated at the paper drive rollers. This buckle provides for correction of any skew. After the tray drive is stopped, the final drive is started by turning on the envelope/paper drive motor 35. The motor 35 then pulls the remainder of the sheet from the tray. The envelope paper drive motor 35 moves the paper to the manual feed sensor 65, which is located within the printer electronics 11. Once this occurs, the printer electronics takes over the drive of the paper through the printer. The drive roller solenoid 42 is then disengaged. The envelope/paper drive motor or motor 35 continues to drive the sheet until the printer's feed rollers have controlled the sheet. The second mode is designated as the envelope feeding mode. In this mode, envelopes which are stacked in tray 20 are fed lengthwise directly into the manual feed slot 21 of the printer by the envelope feed rollers as 90 and 91 and this is done through a deflected path friction separator designated by reference numeral 41. The envelope feed rollers are driven by the envelope paper drive motor 35 through a belt and pulley system as depicted in FIG. 3. The envelope feed rollers are halted when the in feed sensor 65 in the printer which is the printer sensor is reached. As the printer takes control of the envelope, the feeder rotates the envelope drive rollers to assist in moving the envelope out of the envelope tray. When the envelope is into the printer feed slot, the envelope drive motor 35 is deenergized.

It is of course understood that a third mode is the direct manual feeding mode. In this mode direct manual feeding to the printer's manual feed slot is permitted. As seen in FIGS. 1 and 2, the entire mechanism which contains the envelope feed drive can be rotated and hence individual sheets can be fed via the manual feed slot 21 via a chute guide in the rear top cover which is positioned above the envelope tray.

Figure 4:
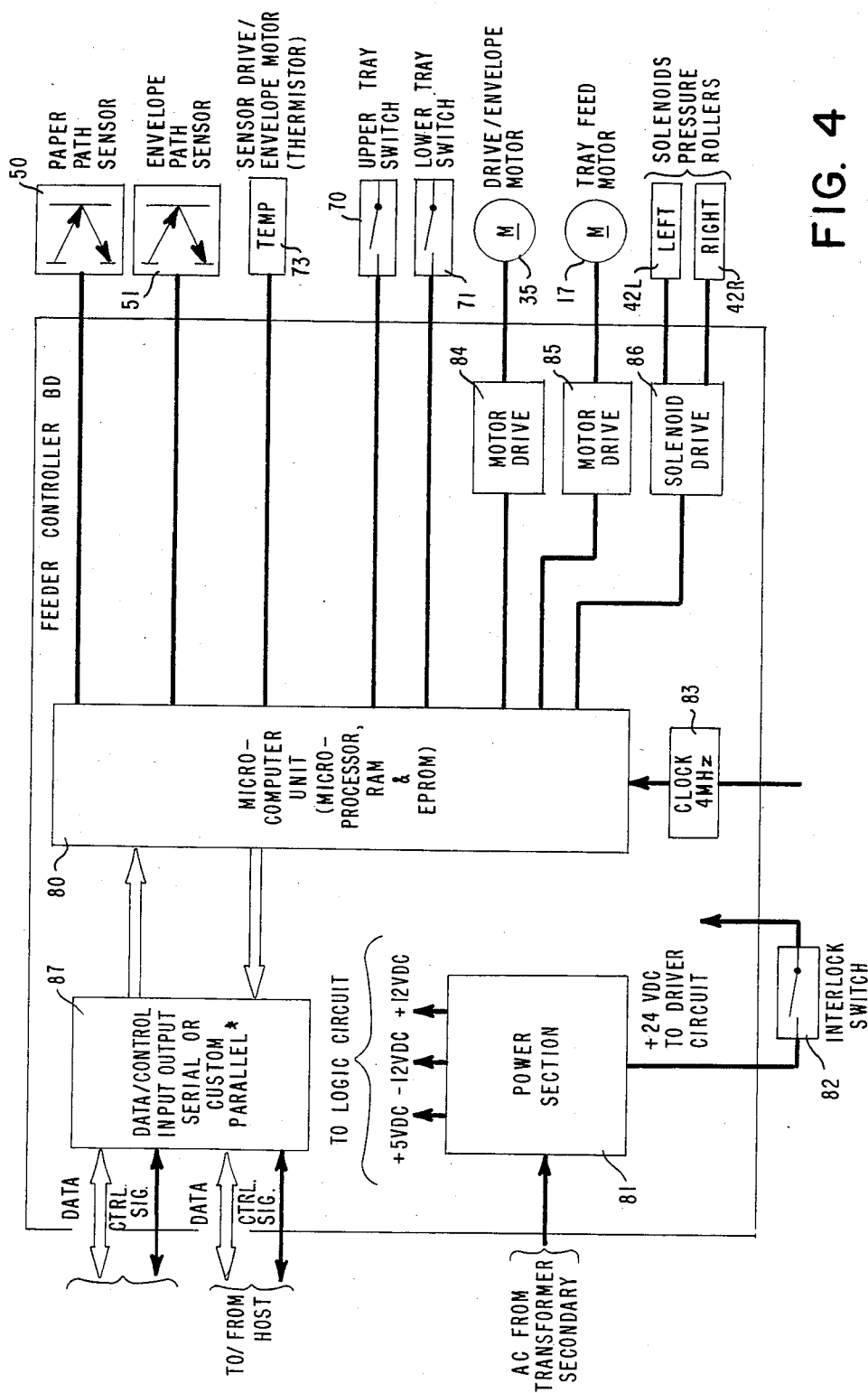
FIG. 4 is a schematic diagram showing the functional control of the paper feeder apparatus as interfacing with the printer.

Referring to FIG. 4, there is shown the electronic controller for the sheet and envelope feeder apparatus as depicted in FIG. 3. Essentially, the controller contains a microcomputer or microprocessor unit 80 which contains a random access memory or RAM and an erasable, programmable read only memory E-PROM. Such microprocessors or microcomputers are available from many sources and is a conventional component. The microprocessor is controlled by a clock 83 which essentially determines the timing operations or sequences for the microprocessor 80. The microprocessor has multiple input/output lines. A first line is connected to the paper path sensor 50 so that information from this sensor can be received by the microprocessor enabling it to perform the control functions as described above. For example, the function of the paper path sensor 50 is to signal the microprocessor according to the paper's progress and then allowing the microprocessor to control the drive rollers. This will be explained in greater detail. The envelope path sensor 51 also provides an input path to the microcomputer to inform the microcomputer about the position of the envelope as emanating from the envelope tray. Also shown as an input to the microcomputer is a sensor drive/envelope motor thermistor 73. This thermistor 73 monitors the temperature of the envelope motor to inform the computer when a predetermined temperature level is exceeded. Two further inputs designated as 70 and 71 constitute the upper tray and lower tray switches. The functions of these switches are merely to determine whether or not the tray as tray 14 or 15 contains paper. These are conventional microswitches. If no paper is contained in the tray, the microprocessor is accordingly informed by switches 70 and 71 and hence the paper drive mode cannot be implemented. Also shown are the motor drive circuits which may include amplifiers 84 and 85 to respectively drive motors 35 and motor 17 under control of the microprocessor. The microprocessor further interfaces with the solenoid drive amplifier 86 to control the solenoid 42 which in turn controls the pressure rollers to allow paper to be moved from the proper paper trays 14 or 15 according to the mode selected by the user. The solenoid drive 86 is again an amplifier which controls solenoid 42 accordingly. The microprocessor interfaces with a data control input or output system module 87. Essentially, the module 87 receives control signals from the printer which is being controlled as well as data signals to enable the operation of the entire assembly. This operation as will be explained, monitors the printer as well as the paper feed to assure that the printer will commence printing when paper is being directed through the assembly. The unit also contains a power section 81 which essentially provides the necessary voltages to energize the microcomputer, the data control 87 as well as the various amplifiers as 84, 85 and 86. There is shown an interlock switch 82 which is a protective device which will remove power or apply power to the assembly as required. Such protective devices, for example, may be associated with the cabinet of the printer to disengage power from the envelope feeder assembly when maintenance is being performed.

Figure 5:
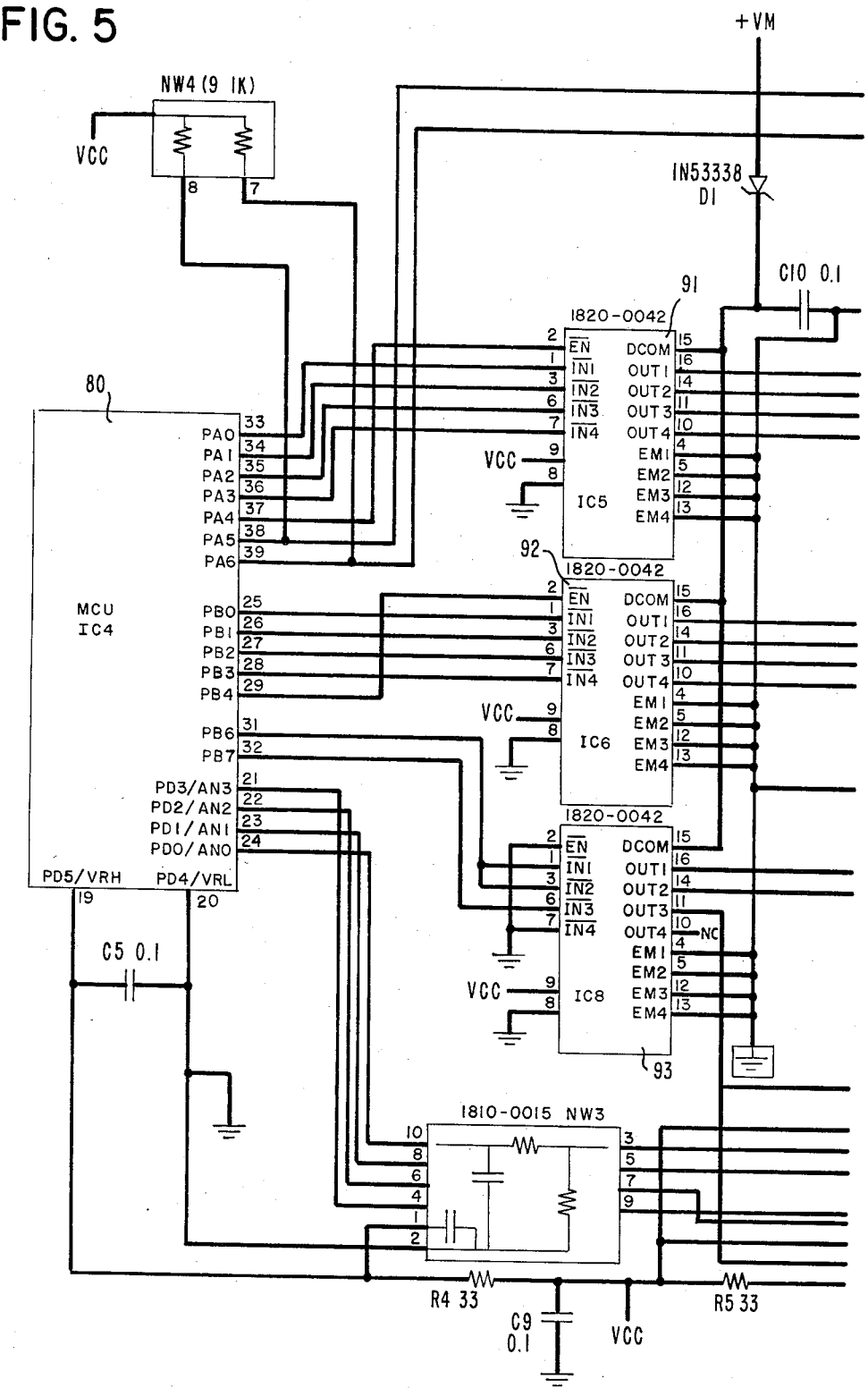
FIG. 5 is a detailed block diagram showing the paper feeder control section.
Figure 5:
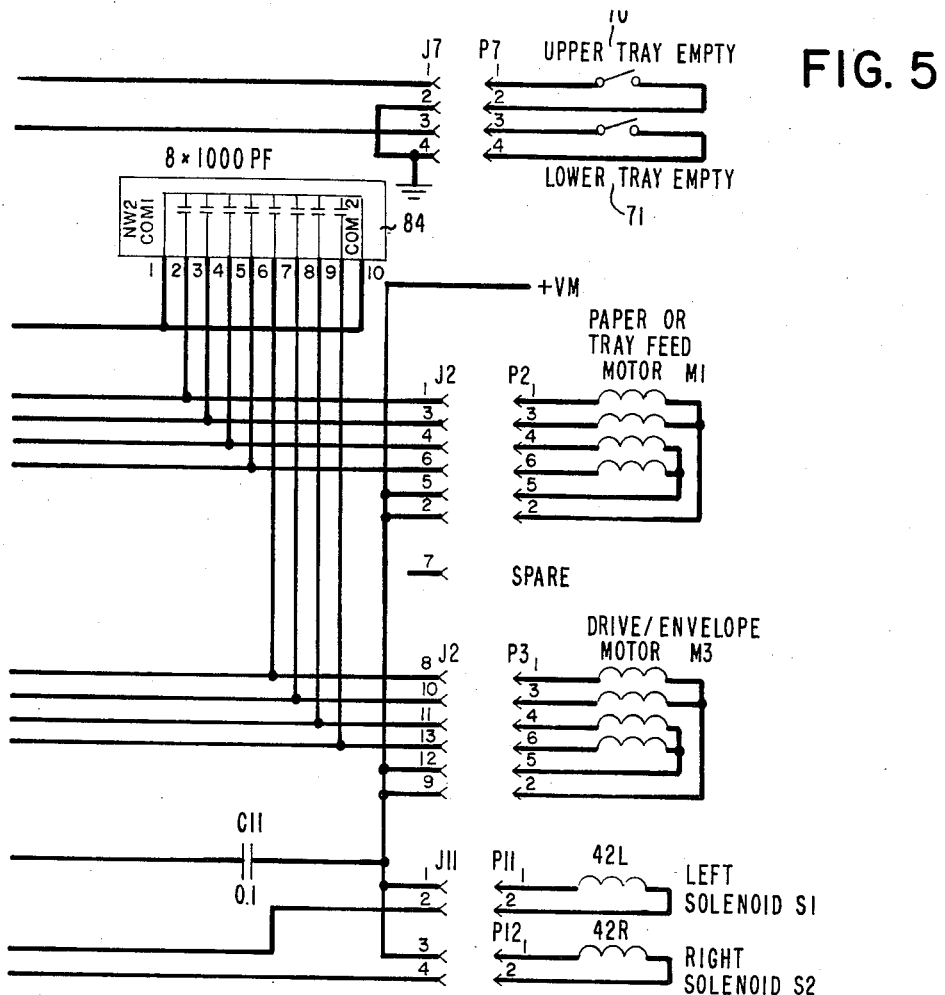
Figure 5:
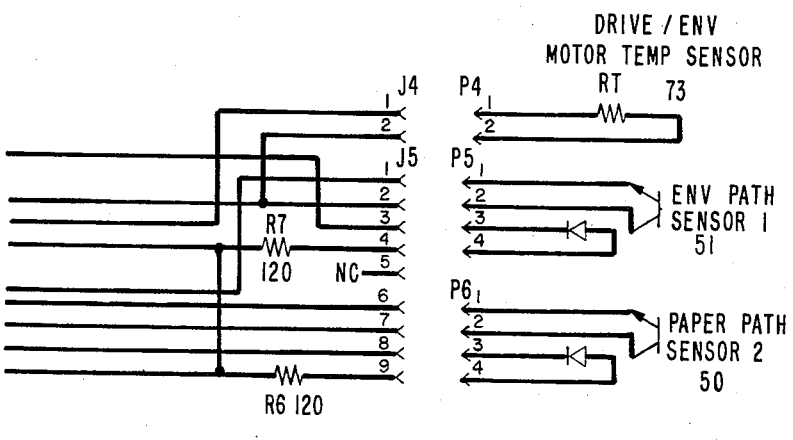

Referring to FIG. 5, there is shown a block diagram of the microcomputer unit 80 designated as MCU and the various circuits to enable the proper drive and sequencing of the motors 35 and 17 which are the tray feed motor 17 and the drive envelope motor 35. As will be explained, the microcomputer unit or MCU 80 is a conventional unit and for example may be the MC 68705R3L microprocessor which is an eight-bit E-PROM microcomputer unit. It is understood that the terms microprocessor and microcomputer are used in technology as both units can provide the required operations. As can be seen from the figure, the microprocessor has a series of output lines with a first group designated as PA0 to PA6, a second group designated as PB0 to PB7 and a third group designated as PD0 to PD3. Each of the output terminals are designated by a suitable reference numeral. As for example PA0 is reference numeral 33, PA1 is 34, PA2 is 35. These numerals designate actual pin connections to the microcomputer unit or MCU 80. The PA outputs are directed as inputs to an integrated circuit chip designated as 91. This integrated circuit chip is a quad driver which is utilized to drive the paper or tray feed motor which essentially is motor 17 of FIG. 3. A similar integrated circuit chip designated as 92 is coupled to the PB0 to PB4 lines which act as inputs for chip 92. This integrated circuit chip 92 is also a quad driver and is utilized to drive the drive envelope motor which is motor 35 of FIG. 3. A capacitor network 84 is connected to all output lines which are utilized for motor drive. The function of the capacitor network is to filter the individual phase drive lines for the motors. As can be seen, the motors are essentially four coil motors consisting of first and second pairs of drive coils for each phase.

Essentially, the MCU 80 sequentially controls the paper or tray feed motor 17 using lines PA0 through PA3 to drive the coils of the motor. PA4 enables the feeder motor circuit 91 to thereby send a signal to that circuit indicating that the tray feed motor 17 is about to be driven. Hence, the quad circuit 91 receives the appropriate inputs from the MCU 80. The appropriate phases such as PA0, PA1, PA2 or PA 3 are presented to the quad driver 91. This enables the quad driver chip and thereby closes the voltage loop to the appropriate motor coil as coils 1, 3, 4, 5 or 6. The positive voltage which may be 24 volts is provided on pins 5 and 2 of the particular motor connector and thereby assures proper polarity to the motor. This, with the activation of a lead such as output 1, output 2, output 3 or output 4, a proper coil of the motor is energized. Upon completion of a phase drive, the power is discharged via the quad circuit 91 and via diode D1 which is a zener diode. Thus, each coil of the motor is sequentially turned on and off in one of two eight-step sequences. In a first sequence, the tray feed motor turns on such that paper is fed from the upper tray. In the second sequence, the reverse order, the motor turns the opposite direction such that paper is fed from the lower tray. The eight steps are derived by sequentially charging one coil, then two adjacent coils, then the next coil and so on. This is a typical motor which is available from many sources and is operated as indicated under control of the MCU unit 80 as programmed and by the quad driver 91 which is connected as shown. The MCU 80 also controls the drive/envelope motor 35 using the output lines PB0 to PB3 and these are employed in conjunction with the quad driver 92 to drive the respective four coils in motor 35. The drive/envelope motor 35 is controlled in the same way as the tray motor 17. Hence, when driven in one direction, the motor feeds an envelope as shown in FIG. 1 and when driven in the opposite direction, the motor continues to drive a sheet of paper which emanates from tray 14 or tray 15 or the envelope into the printer. The operation and control of both motors will be shown in conjunction with the state diagrams shown in FIGS. 8 and 9, as well as the direction of motor drive. In order to implement a paper drive from either tray as 14 or 15 of FIG. 3, the system checks for the presence of paper in each tray. This is done by conventional microswitches as 70 and 71 associated with each tray and coupled to the MCU 80 as inputs thereto. Further explanaton of this operation will be given.

Paper feed sequence, selection and duration of each feed is directly under control of the MCU 80 as programmed and as will be further explained. In any event, the tray feed motor 17 feeds the paper until the paper path sensor 50 senses the paper. The drive/envelope motor 35 continues to feed paper into the printer aligning rollers. During an envelope feed, the motor 35 briefly rotates in one direction to strip the envelope. Then the motor 35 reverses direction to feed the envelope partly into the printer and halts. After a ninesecond delay which is implemented by the MCU, the envelope slowly feeds into the printer at a rate approximating the printer feed rate. The left and right solenoids as 42L and 42R are also controlled via the MCU and via an associated quad driver 93. The quad driver 93 is identical to quad drivers 91 and 92 and it provides the drive signals to the left and right solenoids 42L and 42R and to the paper path and envelope path sensors 51 and 50. Under MCU control the solenoids are energized at the appropriate time to create a slight buckle in the paper being fed along the paper path. The energization of the solenoids brings the set of pressure rollers against the set of drive rollers (FIG. 3). This process creates a buckle in the sheet being fed thereby eliminating any skew that may have occurred when the sheet was pulled from the tray. This operation is shown in FIG. 3 whereby solenoid 42 has a dashed line directed to pressure roller 30. This is the right solenoid 42R. Pressure roller 30 is also associated with solenoid 42L which is the left solenoid shown as FIG. 3. Therefore, pressure roller 30 is activated by the solenoids 42R and 42L to grasp the paper and hence provide the requisite described buckle. The MCU can now activate both solenoids by bringing the output lead designated as PB6 to a low state. This output lead is presented to both solenoids via the IN 1 and IN 2 inputs of the quad driver 82. After the solenoid drive signal ends, the power is discharged via diode D1 to the power supply return. The envelope path and paper path sensors are both enabled in a similar manner except that a lower potential voltage is utilized. To enable these sensors the output lead from MCU 80 designated as PB7 is brought to a low condition. This is directed to the IN 3 input of the quad driver 93. As will be explained, before a paper or envelope drive operation commences, the threshold level of each sensor in regard to the ambient light level is monitored to maintain a given light threshold enabling accurate operation.

The envelope path sensor 51 shown in FIG. 5 and the paper path sensor 50 shown in FIG. 5 essentially consist of reflective type sensors or optical sensors. Each sensor consists of a light emitting diode with an associated photo transistor and each are controlled by the MCU as follows. The identical optical sensors 50 and 51 monitor the presence of paper in the envelope path and in the paper path. When no paper is present, most of the light from the LED is absorbed by a black area in the paper path and therefore the sensor receives a low light reading. When paper is present, most of the light is returned to the sensor creating a high reading or a large value of impedance. These sensor values are returned to the analog ports of the MCU 80. The sensor value for the envelope path is received via the controller board through the associated vents. This value is presented to a resistor capacitor network designated as NW3 and is directed from that network back to the MCU 80 in the PD/AN3 analog port. The low value indicates the absence of an envelope, while a high value indicates the presence of an envelope. The paper path sensor 50 functions in the same way. This sensor value is presented to the control board of the MCU as it passes through the network NW3 and presented to the MCU input designated as PD2/AN2 which is also an analog port. The values of the current used by the two LEDs in the sensors is passed through the capacitor resistor network NW3 and presented to the MCU 80 analog port. This value can be transmitted to the printer controller on request to verify that the LEDs have the proper illumination and are functioning correctly.

The motor temperature sensor 73, is a thermistor. This thermistor 73 monitors the temperature of the drive envelope motor and is provided by the circuitry shown. As the temperature increases, the value of the resistor is decreased. This value is directed through the capacitor resistive network NW3 and is presented to the MCU 80 on the PD0/AN0 port. This value is compared with an internally stored value which value is stored in the MCU memory. If the received value is too high, the drive signals to the drive/envelope motor are halted and an error status is reported. Two additional MCU ports are used for monitoring circuits. Thus, PD5/VRH and PD4/VRL are the voltage reference high and voltage reference low signals respectively. These are the values used for comparison by the analog ports that monitor sensor feedback, LED current and temperature.

As one can see from FIGS. 4 and 5, the micro computer unit or MCU 80 provides the major interface for controlling the drive motor 35, the tray feed motor 17, as well as for controlling the pressure rollers via the solenoids. The MCU also monitors the paper path and the envelope path via the sensors 50 and 51. As shown in FIG. 4, the MCU also interfaces with the data control input and output module 87. This module essentially enables the sheet and envelope feeder apparatus to communicate with the printer so that synchronization can be achieved while the feeder assures that the paper is being directed to the printer when the printer is capable of printing material.

As is well known, such printers which exist in the market place have separate control circuits which interface on a printer control board and which circuits direct the operations and operating characteristics of the printer. Essentially, the data control board as board 87 receives commands from and sends status to the printer control. Thus, the data control board contains a bi-directional data input/output section whereby control signals as well as data can be forwarded from the printer to the data control 87 and back from the data control to the printer.

As indicated above, the micro computer which is the MCU 80 interprets those commands and controls the paper feeder motor, the drive envelope motor, the solenoids and the sensors through the quad driver circuits.

Figure 6:
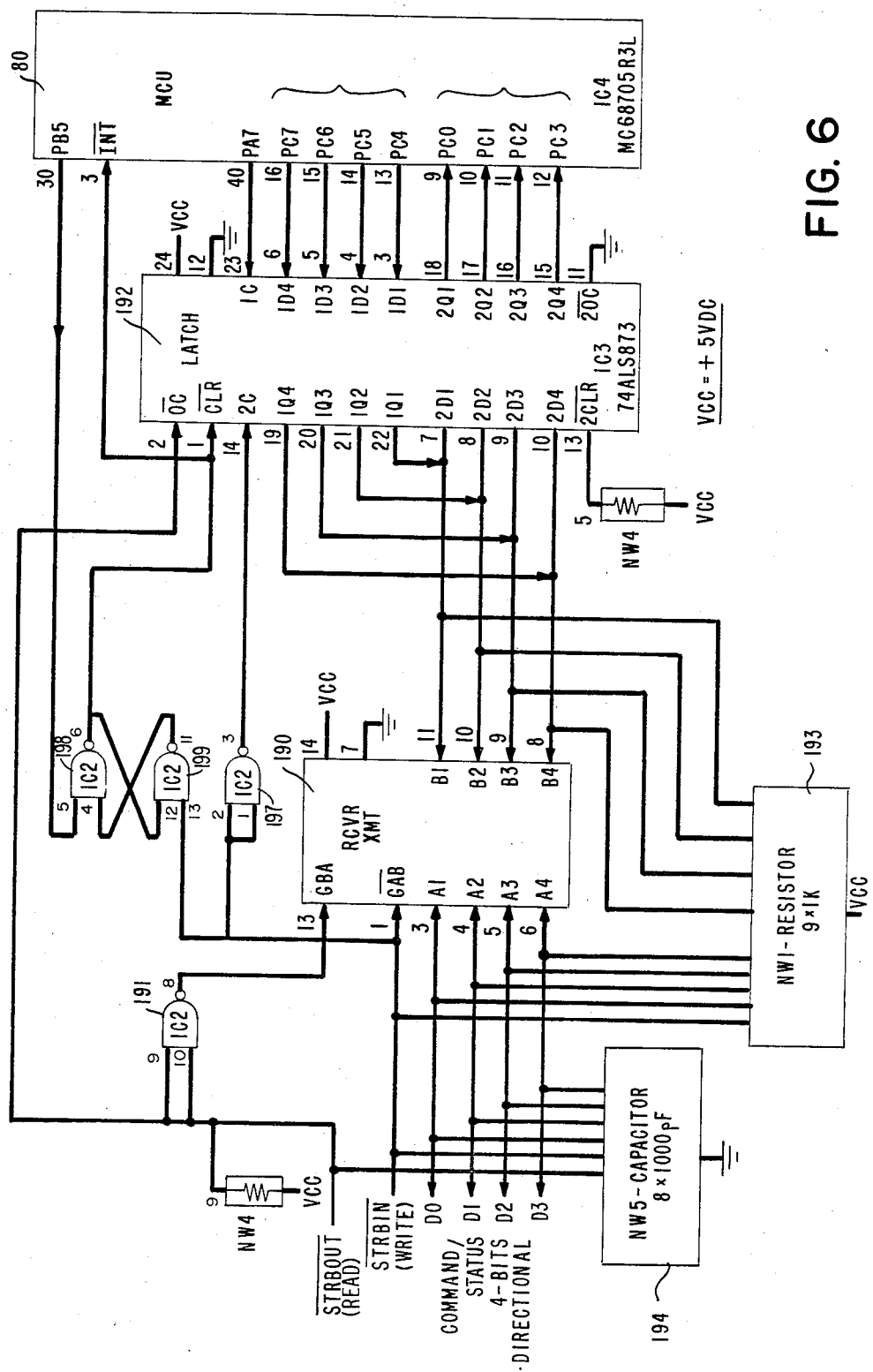
FIG. 6 is a block diagram showing the data input/output interface between the paper feeder and the printer.

Referring to FIG. 6, there is shown a detailed block diagram of the data control module 87 of FIG. 4. Essentially the data input/output section functions as a receiver/transmitter, thereby allowing the sheet and feeder envelope apparatus to communicate with the printer. Module 190 is a transceiver which transceiver is an available integrated circuit component and for example, may comprise a quad bus transceiver available from many manufacturers and sold under the designation 74AS759. The module 190 as indicated is enabled as either a receiver or a transmitter by the $\overline{\text{STRBIN}}$ and $\overline{\text{STRBOUT}}$ signals respectively. These signals are directed from the printer. The $\overline{\text{STRBOUT}}$ signal is directed from the printer and is first applied to an inverter gate 191 which interfaces with the GBA input of the module 190 to receive the $\overline{\text{STRBOUT}}$ signal which essentially is the read signal from the printer. The write signal is coupled directly to the GAB input of module 190.

As seen from FIG. 6, the module 190 is a receiver/transmitter circuit and includes bi-directional input- /output lines which are directed to the command status bits of the printer via output leads D0 to D3. The bi-directional lines are coupled to input terminals A1 to A4 of module 190. Module 190 also interfaces with the MCU via a dual four-bit latching circuit 192. The latching circuit 192 is also a conventional integrated circuit chip available from many manufacturers. The latch circuit 192 functions in a dual mode. It can function in the transmit mode wherein that mode, latches commands to be read by the MCU 80. It also functions in a transmit mode, where it latches status from the MCU. The resistor and capacitor networks designated as 193 and 194 provide wave shaping and proper signal levels for the receive and transmit lines as is conventionally known in the art.

With reference to FIG. 6, a typical interface operation will be explained. The receive/transmit operation determines a sequence of events that constitutes a complete command transmission with status returned to the printer and operates as follows. A ready status signal is received by the printer at the end of the last transmission. This signal constitutes a four bit data command which indicates a ready for transmission from the printer. This command is applied on input lines D0 to D3 associated with the receiver/transmitter module 190 and as seen from FIG. 6 directed to pins A1 to A4 of the receiver/transmitter module 190. It is noted that the receiver/transmitter module 190 is a conventional integrated circuit available from many manufacturers and designated as the 74AS5759. The printer then sends the $\overline{\text{STRBIN}}$ active low pulse. This is directed to the $\overline{\text{GAB}}$ input of the receiver/transmitter 190 which therefore sets $\overline{\text{GAB}}$ low placing the receiver/transmitter module 190 in the receive mode. The inverter portion of IC2, portion 197, which is a integrated circuit containing AND gates is directed through pin 3 to the 2C input of the latch 192. This clocks a command byte into inputs 2D1 to 2D4 of the latch 192. The flip-flop portion of IC2, portion 198 and 199, latches all status registers as ID1 to ID4 in a low state via the $\overline{\text{CLR}}$ input to pin 1 of the latch and generates the $\overline{\text{INT}}$ signal on pin 3 which is directed to the MCU 80. It is noted that ID4 (D3) is low which is equivalent to a not busy signal. The MCU 80 pulses PA7 to a 010 state. This latches the busy status on the command status bus. Any $\overline{\text{STRBOUT}}$ results in a busy status. The MCU 80 reads data from the command latch 192. This is due to the fact that the output pin 20 C is tied to ground which therefore keeps the latch circuit in the enabled state. The MCU pulses PB5 with a 101 to reset the IC2 flip-flop, clear $\overline{\text{INT}}$ and disable $\overline{\text{CLR}}$ which is directed to the latch 192. The MCU pulses PA7, 010 to latch the busy status while processing commands. Any $\overline{\text{STRBOUT}}$ results in busy status. Upon completion of command processing, the MCU 80 assembles the ready status and other status bits, then pulses PA7 (010) to the latch status. The $\overline{\text{STRBOUT}}$ signal from the printer is inverted by gate 191 at pin 8 and provided to GBA which is pin 13 of the receiver/transmitter 190 setting the receiver/transmitter module in the transmit state. The $\overline{\text{STRBOUT}}$ signal also clocks out the status latch via pin 2 of the latch 192. The same process then occurs when the receiver/transmitter module is set in the transmitting mode.

As indicated, the parallel interface for the printer is a four bit data bi-directional interface as shown by input leads D0 to D3 of FIG. 6. This is a conventional approach employed in such printers. In order to read the status, the printer must assert and activate a low bit on $\overline{\text{STRBOUT}}$ This causes the feeder interface to present the four bit status on the data lines as lines D0 to D3. In order to send a command to the feeder which essentially is a command to the MCU 80, the printer must first verify that the feeder is ready for a command by reading the current status. To send a command, the printer asserts an active low on $\overline{\text{STRBIN}}$ with the command on the data lines. The feeder basically features 20 commands which are implemented by the MCU 80. Ten commands are used in a normal operation (two are reserved). Ten commands are diagnostic commands and are used during manufacturing and field service. All commands and their associated command values are shown in Table I. Once a valid command is received by the feeder, the ready/busy status bit changes to busy. Upon completion of the command, the feeder sets the appropriate status bit and changes the ready/busy status bit to ready. The status bit definition is shown in Table II. It is noted that diagnostic commands redefine status definition.

Figure 7:
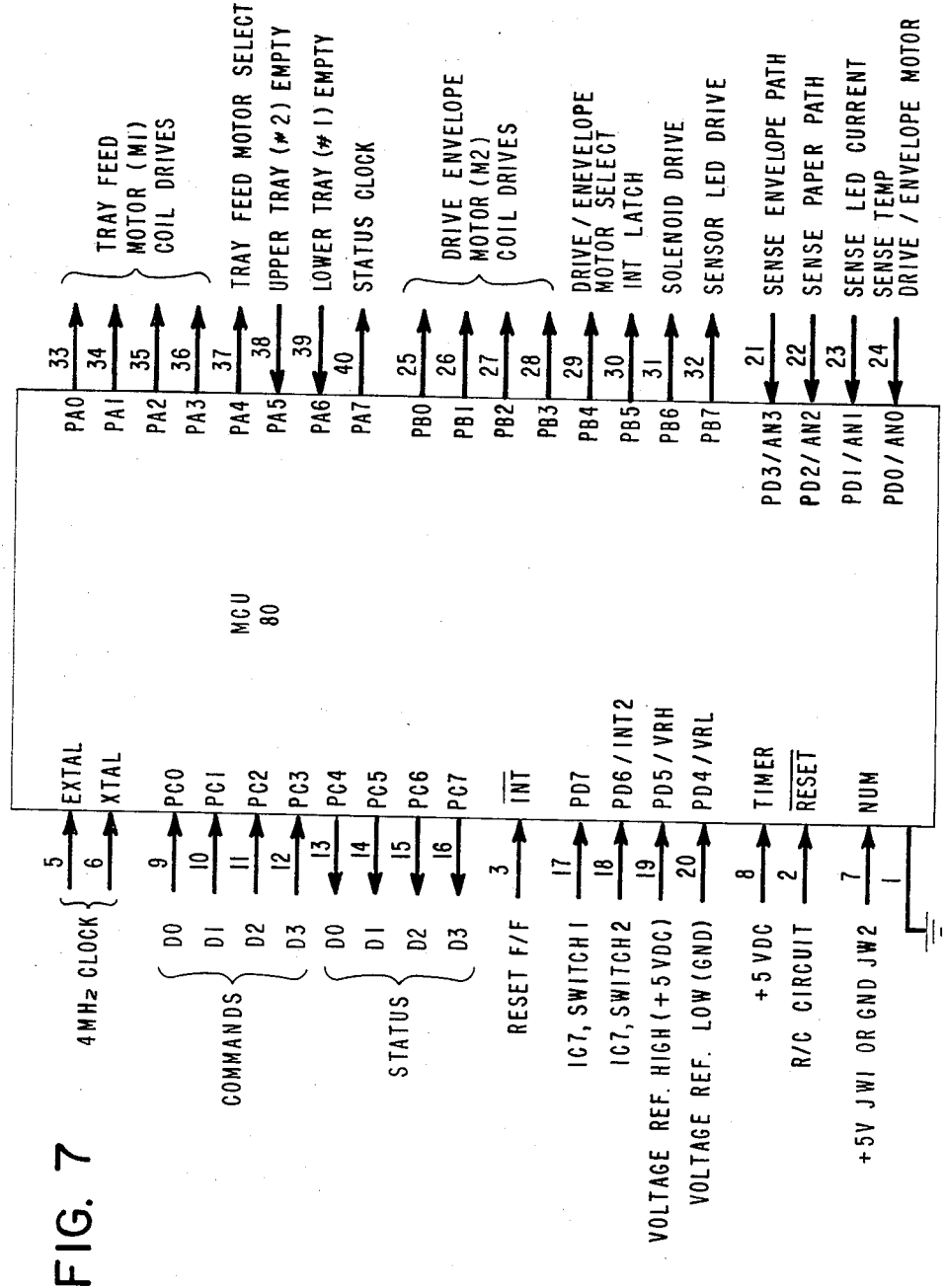
FIG. 7 is a schematic diagram showing the signal flow chart for the microcomputer utilized in this invention.
Figure 11:
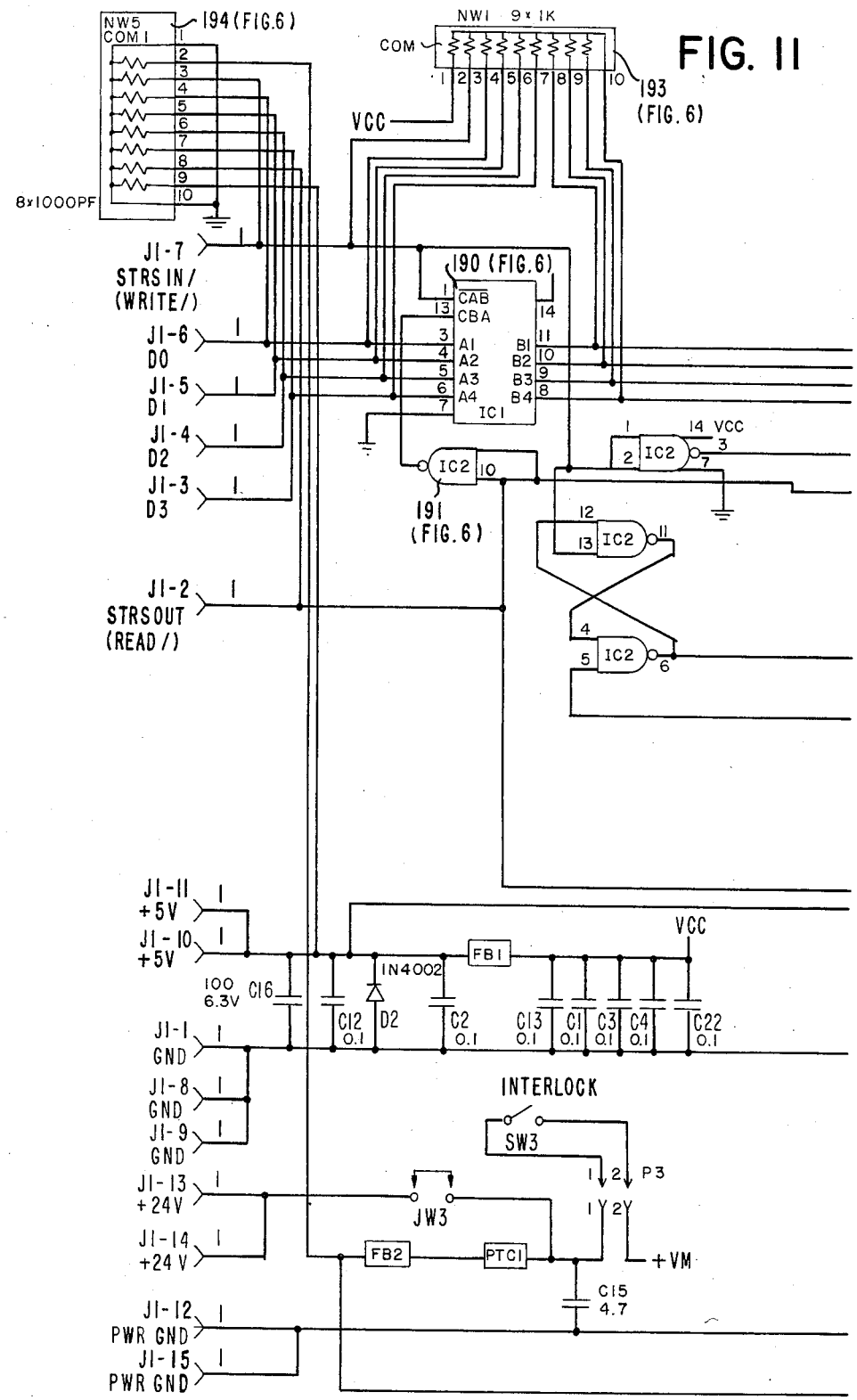
FIG. 11 is a detailed schematic diagram showing the entire control system for a paper feeder apparatus according to this invention.
Figure 11:
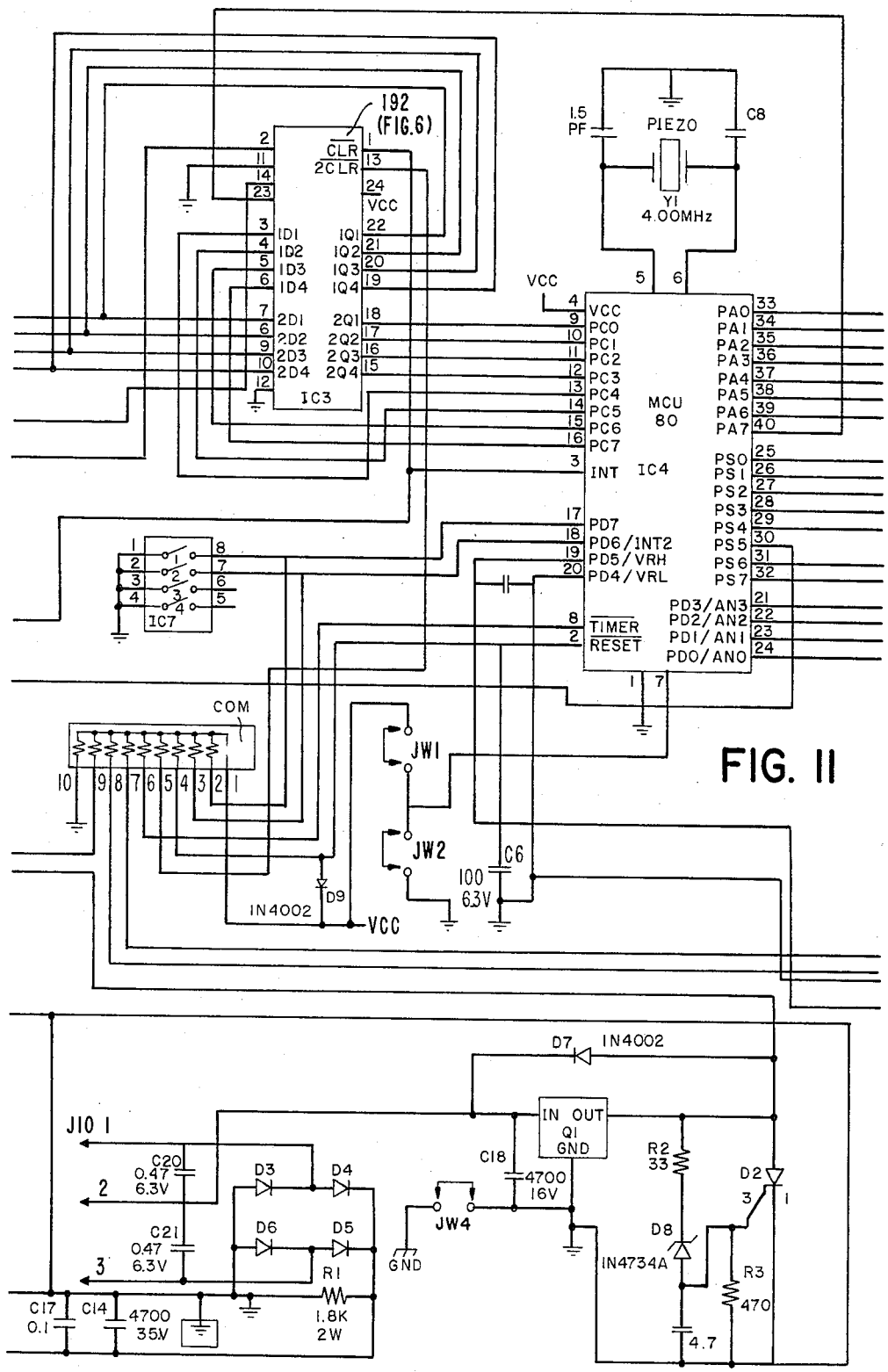
Figure 11:
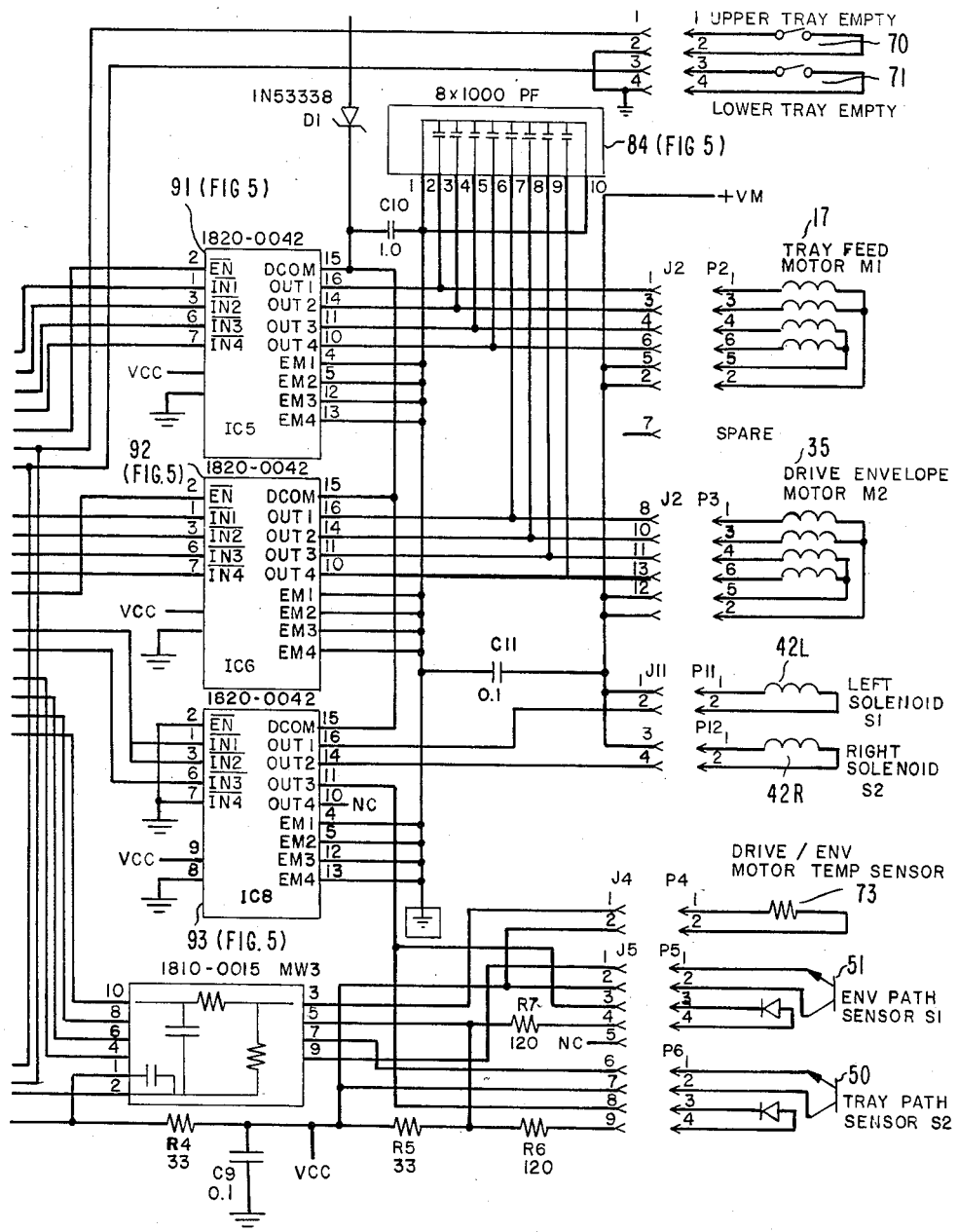

FIG. 11 shows a complete block diagram of the entire electronics which is used to control the feeder. In FIG. 11, all previously discussed modules are shown in detail with all connections implemented for complete control. The following section will describe the individual commands that are associated with the MCU 80 which is, as indicated, the heart of the control system for the feeder. Furthermore, as will be shown, FIG. 7 contains a pin connection of the MCU 80 clearly showing the entire interface with the various control devices such as the tray feed motor 17, the drive/envelope motor 35, the right and left solenoids, the envelope path sensor, the paper path or tray path sensor and the various other components. In FIG. 7, the various integrated circuits are designated according to the nomenclature as IC1, IC2, IC3, IC4 and so on. It is noted that IC4 is in fact the MCU 80 and such designations also are included in FIG. 11. FIG. 11 essentially is a combination of all previously described figures as for example, FIGS. 5 and 6 to show the entire system operation in a complete detailed format. Also shown in FIG. 11 are the power supply configurations which essentially consists of relatively standard components and is not considered to be part of the present invention.

The following paragraphs define the individual commands. Note that the hex values of the commands are shown following the bit structure; for example: Path Check—3. Switch 1 refers to IC7, switch 1. (FIG. 11)

TABLE I

| COMMAND DEFINITIONS | | | | | | |
|---|---|---|---|---|---|---|
| COMMAND | D3 | D2 | D1 | D0 | HEX | SWITCH 1 |
| RESET | 0 | 0 | 0 | 0 | 0 | X |
| DIAGNOSTIC | 0 | 0 | 0 | 1 | 1 | X |
| RESERVED | 0 | 0 | 1 | 0 | 2 | X |
| PATH CHECK | 0 | 0 | 1 | 1 | 3 | X |
| FEED LOWER | 0 | 1 | 0 | 0 | 4 | X |
| FEED UPPER | 0 | 1 | 0 | 1 | 5 | X |
| FEED ENVELOPE | 0 | 1 | 1 | 0 | 6 | X |
| RESERVED | 0 | 1 | 1 | 1 | 7 | X |
| UPPER TRAY STATUS | 1 | 0 | 0 | 0 | 8 | X |
| LOWER TRAY STATUS | 1 | 0 | 0 | 1 | 9 | X |
| LAMP CURRENT SENSOR | 1 | 0 | 1 | 0 | A | OFF |
| ENVELOPE PATH SENSOR | 1 | 0 | 1 | 1 | B | OFF |
| MOTOR TEMPERATURE SENSOR | 1 | 1 | 0 | 0 | C | OFF |
| TRAY PATH SENSOR | 1 | 1 | 0 | 1 | D | OFF |
| REPORT HIGH NIBBLE | 1 | 1 | 1 | 0 | E | X |
| REPORT LOW NIBBLE | 1 | 1 | 1 | 1 | F | X |
| OUTPUT ATE | 1 | 0 | 1 | 0 | A | ON |

TABLE I-continued
COMMAND DEFINITIONS

| COMMAND | D3 | D2 | D1 | D0 | HEX | SWITCH 1 |
|---|---|---|---|---|---|---|
| INPUT 1 ATE | 1 | 0 | 1 | 1 | B | ON |
| INPUT 2 ATE | 1 | 1 | 0 | 0 | C | ON |
| CHECKSUM | 1 | 1 | 0 | 1 | D | ON |

X—Don't Care - May be ON or OFF.

TABLE II
STATUS DEFINITIONS

| STATUS | D3 | D2 | D1 | D0 |
|---|---|---|---|---|
| BUSY | 0 | X | X | X |
| READY | 1 | Y | Y | Y |
| PAPER EMPTY | Y | 1 | Y | Y |
| PAPER JAM | Y | Y | 1 | Y |
| ERROR | Y | Y | Y | 1 |

X—Don't Care; Y = Valid Status as defined herein.

Reset Command (0)—This command causes a warm restart of the Feeder firmware. This command is provided for use during Printer interface debugging and not intended for normal use. Note that the RESET command initializes the sensor thresholds; the paper path must be clear of paper.

An ERROR status will be returned if the MCU did not pass the RAM and ROM verification tests.

Diagnostic Command (1)—This command performs a PROM verification, a heat measurement of the drive/envelope motor and a countdown verification of the status lines.

This command is also used as the power-up command. After power on, to determine if the Feeder is ready for use, the Printer interface must send the DIAGNOSTIC command once the READY/BUSY status is READY. The printer interface should verify that the READY/BUSY status changes immediately to BUSY with all other status lines equal to zero. After the completion of the PROM verification and drive motor heat sensing, the DIAGNOSTIC command tests all of the status lines. The Printer interface should verify that the status lines change, as shown below, with a minimum time interval between each change of 1.3 milliseconds.

DIAGNOSTIC STATUS VERIFICATION

| D3 | D2 | D1 | D0 | |
|---|---|---|---|---|
| 0 | 1 | 1 | 1 | |
| 0 | 1 | 1 | 0 | |
| 0 | 1 | 0 | 1 | |
| 0 | 1 | 0 | 0 | |
| 0 | 0 | 1 | 1 | |
| 0 | 0 | 1 | 0 | |
| 0 | 0 | 0 | 1 | |
| 0 | 0 | 0 | 0 | 0 - No Diagnostic Error |
| 0 | 0 | 0 | 0 | 1 - Diagnostic Error |

Following this sequence, the READY/BUSY status (D3) will change to a one to allow a read of the diagnostic status. If D0 is one when the READY/BUSY status is one, then the DIAGNOSTIC command has determined that a ROM error or heat sensor error has occurred.

Reserved (2)—future use.

Path Check Command (3)—This command checks the paper and envelope path for paper. If paper is present, the ERROR status is set. This command is used after a jam condition to verify that the paper paths are clear.

Feeds Commands—The FEED LOWER (4), FEED UPPER (5) and FEED ENVELOPE (6) commands first check the paper paths for paper and then check if the drive motor is too hot. If one or both of these errors exist, the ERROR status is returned and the command is aborted.

For FEED LOWER and FEED UPPER commands, the trays are checked for the presence of paper. If the tray is empty, the PAPER EMPTY status is returned and the command is aborted.

If five consecutive paper or envelope loads were aborted due to the paper not reaching the appropriate path sensor, all status is set (i.e., PAPER EMPTY, PAPER JAM, ERROR), and the Feeder must be rest by a power-off/power-on sequence or the RESET command.

The paper/envelope load process consists of stepping the appropriate tray motor coils to move the paper/envelope to the path sensor. If the paper/envelope is not sensed at the path sensor, the PAPER JAM status is returned to the command is aborted.

The paper/envelope is moved from the path sensor to the drive rollers using the tray feed motor for paper or the drive/envelope motor for envelopes. The drive rollers move the paper or envelope into the Printer. The paper must be sensed by the Printer interface and the PAPER-IN-PLACE command must be sent to stop the paper motion. NOTE: The PAPER-IN-PLACE command is sent while the READY-IN-PLACE command before exceeding the maximum number of drive motor steps, the ERROR status is set and the READY/BUSY status goes READY.

Reserved (7)—future use.

Upper Tray Status Command (8)—This command verifies paper in the upper tray. If the tray is empty, the PAPER EMPTY status is returned.

Lower Tray Status Command (9)—This command verifies paper in the lower tray. If the tray is empty, the PAPER EMPTY is returned.

Sensor Read Commands—The Sensor Read Commands are:
LAMP CURRENT SENSOR (A)
ENVELOPE PATH SENSOR (B)
MOTOR TEMPERATURE SENSOR (C)
TRAY PATH SENSOR (D)

These diagnostic commands are not intended for normal operation. These commands used in conjunction with REPORT HIGH NIBBLE AND REPORT LOW NIBBLE allow the user interface or a test drive to receive the hexadecimal A/D value of the appropriate sensor.

Once these commands are sent to the Feeder, the appropriate sensor reading is taken and stored in Feeder memory. REPORT HIGH NIBBLE command causes the high four bits of the last sensor reading to be put on the status lines (D3 being the most significant bit). REPORT LOW NIBBLE command causes the low four bits of the last sensor reading to be put on the status lines.

Nibble Report Commands—The REPORT HIGH NIBBLE (E) and REPORT LOW NIBBLE (F) commands are used with other diagnostic commands to put four bits of data on the status lines. The data presented is the data generated by the last execution of the following commands:
Lamp Sensor Envelope Path Sensor
Motor Temperature Sensor
Tray Path Sensor
Checksum Output ATE (A)—This diagnostic command is used for ATE testing of the programmed MCU output ports. This command clears (sets to zero) each defined output bit in the following order:
PA 0, 1, 2, 3, 4, 7
PB 0, 1, 2, 3, 4, 5, 6, 7
PC 4, 5, 6, 7

Input 1 ATE (B) and Input 2 ATE (C)—This diagnostic command is used for ATE testing of the programmed MCU input ports. This command reads the appropriate input ports and sets the status lines as follows:

| INPUT 1 ATE | |
|---|---|
| Status Line | Input Port Read |
| D3 | PC3 |
| D2 | PC2 |
| D1 | PC1 |
| D0 | PC0 |

| INPUT 2 ATE | |
|---|---|
| Status Line | Input Port Read |
| D3 | PD6 |
| D2 | PD5 |
| D1 | PA6 |
| D0 | PA5 |

Checksum (D)—This diagnostic routine reports the checksum of the firmware. This reporting is done using REPORT HIGH NIBBLE and REPORT LOW NIBBLE.

Paper/Envelope Load Sequence—The following Feeder command sequence should be used in loading paper/envelopes:
(1) FEED UPPER/FEED LOWER/FEED ENVELOPE
(2) PAPER-IN-PLACE
(3) MOVE PAPER
(4) PATH CHECK If an error status (i.e., PAPER EMPTY, PAPER JAM, ERROR) occurs during any of the above commands, the following commands can be used to verify the error:
UPPER TRAY STATUS
LOWER TRAY STATUS
PATH CHECK
DIAGNOSTIC General—A simplified signal flow diagram of the processor interconnection is shown in FIG. 7. The MCU consists of a single large scale integrated (SL1) 8-bit microcomputer device designated as IC4. Two types can be used: the MC6805R2 or the MC68705R3L.

The MCU processes commands from the printer controller to direct the Feeder via the Feeder Controller section. Additionally, the status of the switches and sensors in the Feeder Section are monitored and provided back to the Printer controller.

The switch closures lines, input/output lines, and the sensor lines to the MCU are individually filtered and conditioned to minimize any undesired transient signals.

I/O Signal Functions—The MCU input/output signal functions are given as follows. The first column, Nomenclature, identifies a specific input/output MCU signal functional designation. The second column, PIN, gives the MCU device pin connection designation for the specific MCU function signal. The third column, I/O identifies whether the specific signal is an input or an output of the MCU. The Description column gives a brief functional description of what occurs when the specific signal is active and its functional significance in operation.

TABLE III

| MCU INPUT/OUTPUT SIGNAL FUNCTIONS (IC4) | | | |
|---|---|---|---|
| NOMEN-CLATURE | PIN | I/O | DESCRIPTION |
| VSS | 1 | OUT | MCU common power and signal return. |
| RESET | 2 | IN | Active low MCU reset signal supplied by controller board (FIG. 11) reset R/C circuit that is connected to +5VDC and activated by power ON/OFF. |
| $\overline{INT}$ | 3 | IN | Interrupt. Active low external input for MCU. Supplied by STROBIN flip-flop circuit (FIG. 5) IC2 that is functionally part of the data I/O section. |
| VCC | 4 | IN | +5VDC Power. Operating power supplied to MCU from the power supply section. (FIG. 11) |
| EXTAL | 5 | IN | MCU internal clock connection to external piezo device. (FIG. 11) |
| XTAL | 6 | IN | MCU internal clock connection to external piezo device. (FIG. 11) |
| NUM | 7 | IN | Prewired to +5VDC logic power (logic 1 level) via jumper wire JW1 if MCU version is an MC6877705R3L type device. Prewired to logic power return (logic 0 level) via jumper wire JW2 if MCU version is an MC6805R2 type device. |
| TIMER | 8 | IN | Permits external input to be used to decrement the MCu internal timer circuitry. In this application, this pin is hardwired to the +500VDC logic power. |
| PC0 | 9 | IN | MCU Port C Data Bit 0. Programmed as an MCU input. Data bit corresponds to the D0 command bit from the Printer controller. (FIG. 6) |
| PC1 | 10 | IN | MCU Port C Data Bit 1. Programmed as an MCU input. Data bit corresponds to the D1 command bit from the Printer controller. (FIG. 6) |
| PC2 | 11 | IN | MCU Port C Data Bit 2. Programmed as an MCU input. Data bit corresponds to the D2 command bit from the Printer controller. (FIG. 6) |
| PC3 | 12 | IN | MCU Port C Data Bit 3. input. Data bit corresponds to the D3 command bit from the Printer controller. (FIG. 6) |
| PC4 | 13 | OUT | MCU Port C Data Bit 4. Programmed as an MCU output. Data bit corresponds to the D0 status bit to the Printer controller. (FIG. 6) |
| PC5 | 14 | OUT | MCU Port C Data Bit 5. Programmed as an MCU output. Data bit corresponds to the D1 status bit to the Printer controller. (FIG. 6) |
| PC6 | 15 | OUT | MCU Port C Data Bit 6. Programmed as an MCU output. Data bit corresponds to the D2 status bit to the printer |

TABLE III-continued
MCU INPUT/OUTPUT SIGNAL FUNCTIONS (IC4)

| NOMEN-CLATURE | PIN | I/O | DESCRIPTION |
|---|---|---|---|
| | | | controller. (FIG. 6) |
| PC7 | 16 | OUT | MCU Port C Data Bit 7. Programmed as an MCU output. Data bit corresponds to the D3 status bit (BUSY) to the printer controller. (FIG. 6) |
| PD7 | 17 | IN | MCU Port D Data Bit 7. Programmed as an MCU input. Data bit corresponds to the IC7, switch 1 selection. Switch open provides a logic 1 level; switch closed provides a logic 0 level. Open = Normal Operation; closed = diagnostic mode. |
| PD6/INT2 | 18 | IN | MCU Port D Bit 6. Programmed as an MCu input. Data bit corresponds to IC7, switch 2 selection. Open = 1; closed = 0. |
| PD5/VRH | 19 | IN | MCU Port D bit 5. Programmed as an MCU input. Voltage reference pin for MCU internal A/D converter. Hardwired to +5VDC logic power. |
| PD4/VRL | 20 | IN | MCU Port D Bit 4. Programmed as an MCU input. Voltage reference return pin for MCU internal A/D converter. Hardwired to GND. |
| PD3/AN3 | 21 | IN | MCU Port D Bit 3. Programmed as an analog input. Voltage corresponds to envelope path sensor output. |
| PD2/AN2 | 22 | IN | MCU Port D Bit 2. Programmed as an analog input. Voltage corresponds to the paper path sensor output. |
| PD1/AN1 | 23 | IN | MCU Port D Bit 1. Programmed as an analog input. Voltage corresponds to the LED currents into NW3 for monitoring LED status. |
| PD0/AN0 | 24 | IN | MCU Port D Bit 0. Programmed as an analog input. Voltage corresponds to the thermistor sensor output for the drive/envelope motor. |
| PB0 | 25 | OUT | MCU Port B Bit 0. Programmed as an MCU output. Data bit (active state = low) used as the drive/envelope motor coil 2 drive signal. |
| PB1 | 26 | OUT | MCU Port B Bit 1. Programmed as an MCU output. Data bit (active state = low) used as the drive/envelope motor coil 1 drive signal. |
| PB2 | 27 | OUT | MCU Port B Bit 2. Programmed as an MCU output. Data bit (active state = low) used as the drive/envelope motor coil 3 drive signal. |
| PB3 | 28 | OUT | MCU Port B Bit 3. Programmed as an MCU output. Data bit (active state = low) used as the drive/envelope motor coil 4 drive signal. |
| PB4 | 29 | OUT | MCU Port B Bit 4. Programmed as an MCU output. Data bit (active state = low). Enables drive/envelope motor. |
| PB5 | 30 | OUT | MCU Port B Bit 5. Programmed as an MCu output. Interrupt latch pulse (101) to IC2 reset flip-flop. |
| PB6 | 31 | OUT | MCU Port B Bit 6. Programmed as an MCU output. Data bit (active state = low), used as the drive signal for the left and right solenoids. |
| PB7 | 32 | OUT | MCU Port B Bit 7. Programmed as an MCU output. Data bit (active state = low) used as the drive signal for the paper path and envelope path sensors. |
| PA0 | 33 | OUT | MCU Port A Bit 0. Programmed as an MCU output. Data bit (active state = low) used as the tray feed motor coil 2 drive signal. |
| PA1 | 34 | OUT | MCU Port A Bit 1. Programmed as an MCU output. Data bit (active state = low) used as the tray feed motor coil 1 drive signal. |
| PA2 | 35 | OUT | MCU Port 1 Bit 2. Programmed as an MCU output. Data bit (active state = low) used as the tray feed motor coil 3 drive signal. |
| PA3 | 36 | OUT | MCU Port A Bit 3. Programmed as an MCU output. Data bit (active state = low) used as the tray feed motor coil 4 drive signal. |
| PA4 | 37 | OUT | MCU Port A Bit 4. Programmed as an MCU output. Data bit (active state = low) enables tray feed motor. |
| PA5 | 38 | INPUT | MCU Port A Bit 5. Progrmmed as an MCu input. Data bit corresponds to the upper paper tray switch status. Switch open provides a logic 1 level when upper tray contains paper. |
| PA6 | 39 | INPUT | MCU Port A Bit 6. Programmed as an MCU input. Data bit corresponds to the lower paper tray switch status. Switch open provides a logic 1 level when lower tray contains paper. |
| PA7 | 40 | OUT | MCU Port A Bit 7. Programmed as an MCU output. Status clock pulse (010) to IC3. |

Figure 8:
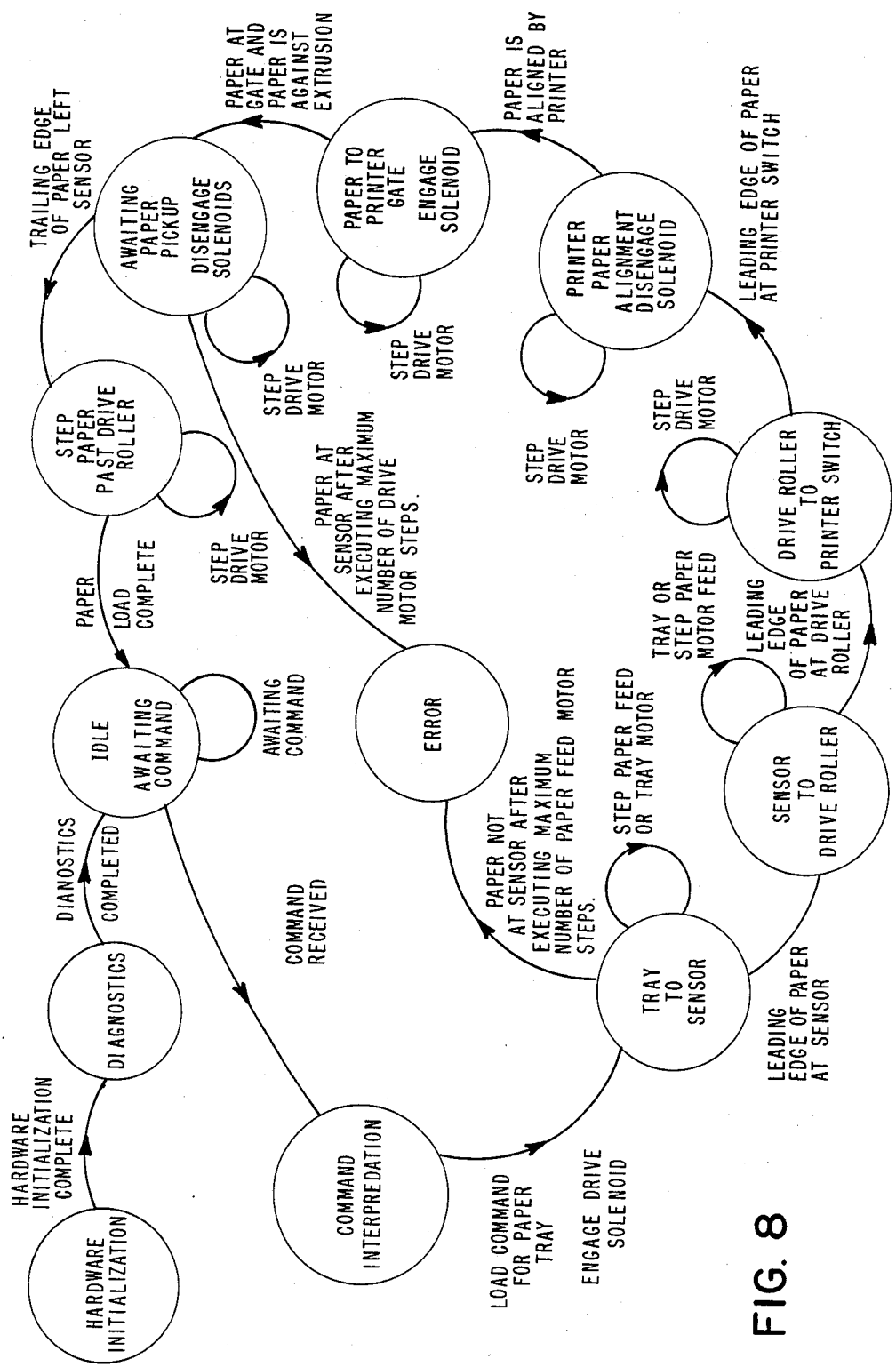
FIG. 8 is a state diagram showing a paper load routine.

Referring to FIG. 8, there is shown a state diagram of the paper load routine. Essentially, FIG. 8 depicts a state diagram and based on the preceding figures, should make it completely clear on how the microprocessor or micro computer 80 is programmed to implement the various features. The state diagram in regard to FIG. 8 will be discussed with reference to FIG. 3 so that one can ascertain how the various component parts are in fact controlled by the microprocessor as indicated above. It is of course noted that all command operations as well as microprocessor states have been described in order to clearly ascertain how the program control is implemented.

As seen in FIG. 8, the computer initially performs a hardware initialization routine which is a typical procedure. This initialization routine involves completion of diagnostics which are associated with the self-checking mechanisms as described above. In this manner, the various component parts of the feeder are checked according to specific subroutines. Hardware initialization as well as diagnostics are well known and essentially in regard to the above-noted description should be evident to those skilled in the art. In any event, as shown, after the completion of the diagnostics, the feeder is in an idle state and awaits a command. This is shown by the idle module in the state diagram. The type of command that the feeder would expect to receive is a command from a user indicating that the printer is to be employed, selection of the paper size which essentially selects either tray 14 or 15 or selection of the envelope mode which essentially selects the envelope feed as from envelope tray 20 of FIG. 3. This, of course, is implemented by means of three separate switches or buttons which when depressed will implement the proper paper mode by selecting the proper paper size as paper accommodated in tray 14 or 15 or an envelope mode as accommodated by the envelope tray 20. Once the command is received, this command is directed to the microprocessor then which in turn interprets the command according to the signal received. As can be seen from FIG. 7, these commands are applied to inputs PC0 to PC3 designated as the command inputs of the MCU 80. Essentially, the command lines constitute four bits but could be implemented as by a single bit on each of the four lines. For example, a command on input PC0 could indicate selection of paper tray 14 of FIG. 3, an input on PC1 indicates selection of paper tray 15 and so on. In any event, the microprocessor MCU 80 interprets the command and then loads the command for paper tray operation and essentially selects the proper motor rotation to direct paper via the paper feed motor 17 of FIG. 3 from either tray 14 or 15.

Essentially, the first step that would occur is that the solenoids 42 would be operated after command interpretation. Solenoid 42 is operated and the paper feed motor is then stepped. The paper feed motor as indicated in FIG. 3 is motor 17 and depending on its direction of rotation, will cause paper to be directed either from tray 14 or 15 as interpreted by the MCU 80 according to the signal received. Essentially, the microprocessor now expects to receive an output from the paper path sensor 50 indicating that the paper has been directed so that the leading edge of the paper is at the sensor. This signal is again sent back to the MCU 80 via the input 22 as shown in FIG. 7. The paper feed motor continues to be stepped until the leading edge of the paper is at the drive rollers 30 and 31. This sensing is done by stepping the paper feed motor a predetermined number of steps where it is then assumed that the leading edge of the paper is at the drive roller or rollers 30 and 31.

The next step is to step the envelope paper drive motor 35 to assure that the leading edge of the paper is at the printer sensor 65. This again requires the MCU to step the motor a predetermined number of times which is indicative of the paper being at the printer sensor. As soon as this occurs, the solenoid 42 is disengaged which as indicated previously, operation of the solenoid assures alignment of the paper and hence during this step the drive motor is continued to be operated but because the solenoids have been operated, the paper is adequately buckled and skewed. Essentially, the drive motor continues to be operated until the paper is at the slot 21 and the printer sensor 65 has been activated. Essentially what happens is the feeder now via the MCU awaits the paper pickup by the printer. The feeder determines paper pickup by the printer which essentially means that the paper is now introduced into the manual slot 21 of the printer whereby the sensor of the printer which is sensor 65 of FIG. 3 is activated. In any event, this is further checked by the fact that while the paper is near slot 21, the paper path sensor 50 is still covered by the presence of the paper. As the paper is drawn into the printer, the trailing edge of the paper leaves the sensor 50, thus allowing the sensor to again indicate the presence of no paper. This is detected by the MCU 80 which continues to drive the step motor to allow the paper to drive past the drive rollers 30 and 30. Once this occurs, the MCU assumes that the paper load is complete and therefore, the paper is now under control of the printer via the printer feed rollers as 60, 61 and 62. In this manner, the system returns to idle.

Also seen from the state diagram for paper load are the various error signals which are also controlled by the MCU 80. In other words, as seen in the diagram, the paper is assumed to be at the sensor after a predetermined number of motor steps. This is exactly the same case for the paper feed motor as well as the drive motor. If the sensors are not activated after these steps have been executed, then it is assumed that the paper has not arrived or that there is a paper jam or in some manner, the system is not functioning. This produces an error signal which indicates a paper jam or requires some further investigations.

Figure 9:
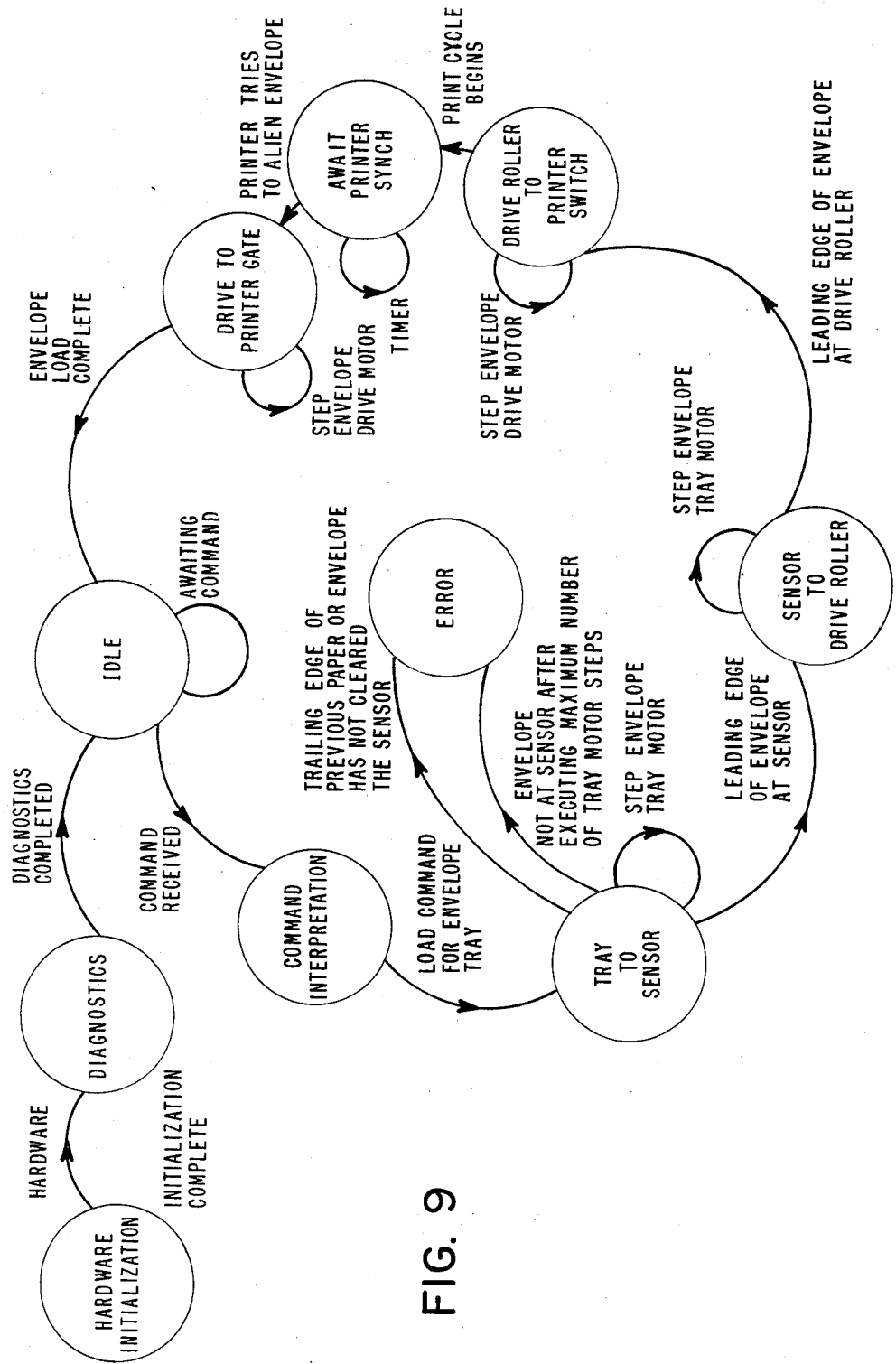
FIG. 9 is a state diagram showing an envelope load routine.
Figure 10:
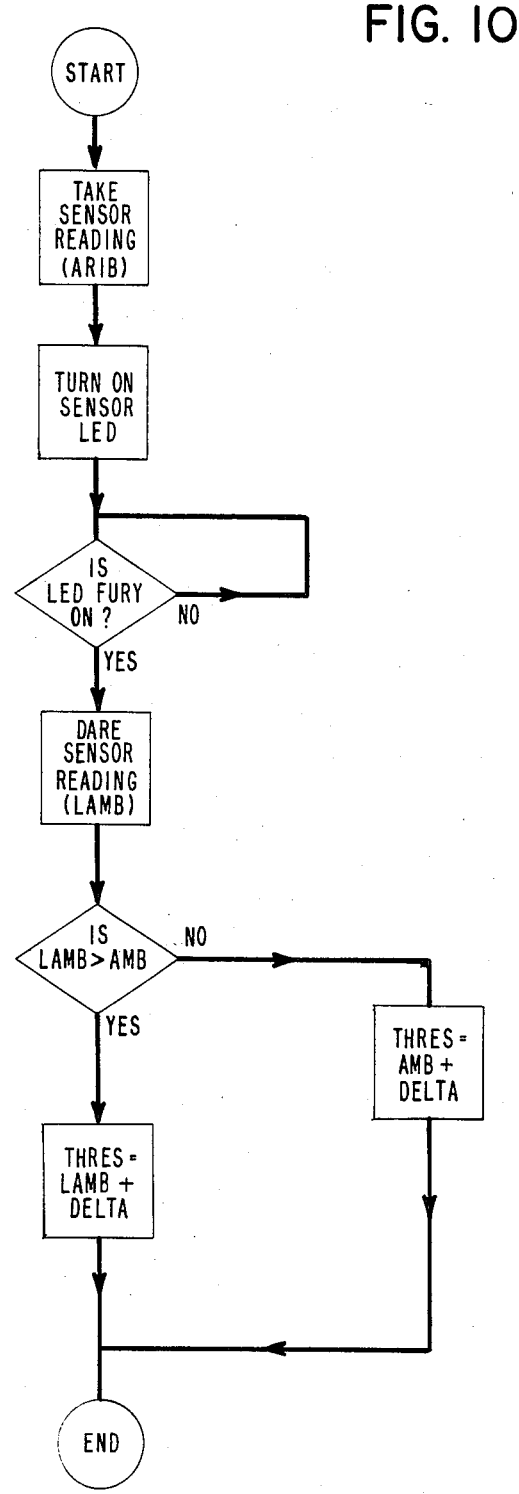
FIG. 10 is a flow chart showing a dynamic sensor threshold mode implemented by this system.

Referring to FIG. 9, there is shown a state diagram for the envelope load as performed by the MCU 80. The diagram can be followed in regard to the above-noted specification in conjunction with the description of the MCU and should be apparent to those skilled in the art on how the MCU 80 is operated to perform the various matters. More importantly, as shown in FIG. 10, there is a dynamic sensor threshold operation performed which essentially is a routine executed by the MCU 80 before each paper or envelope load cycle commences. Essentially, as indicated and shown above and especially in conjunction with the above-noted figures, each of the sensors as for example the paper path sensor and the envelope path sensor are optical devices consisting of a light emitting diode and optical transistor. In any event, in most prior art devices, the magnitude or light intensity was controlled by means of a potentiometer in order to adjust such sensors to determine the maximum reflection capability of the paper to assure that the sensor was able to determine whether paper was present or not. As one can ascertain, paper varies greatly in regard to color, texture, reflectivity and so on. Therefore, many printers as well as paper feeders cannot handle all different types of paper. In regard to this, the solution has been effectively solved in enabling this paper feeder to handle a great number of different quality as well as different color papers by performing a dynamic sensor threshold test check.

The flowchart for this procedure is shown in FIG. 10. Essentially as indicated, before the start of any paper or envelope load cycle, both sensors are sequentially read by means of the microprocessor. The sensors are read via the phototransistors which, as indicated, are coupled directly to the MCU 80. Then after reading the particular voltage which is under ambient conditions with no light on the sensor, the microprocessor turns on the LED associated with each of the sensors. It does so by generating a activating signal via the path as for example, shown in FIG. 5. Thus, each LED is now activated and a new sensor reading is taken with light impinging upon the associated phototransistor. This develops a new voltage which is stored. The microprocessor is then instructed to compare the value of the phototransistor resistance with the LED light impinging upon the same together with the value of the phototransistor resistance based on ambient light. If the value of the phototransistor resistance is greater than the value with ambient light, then one particular threshold which is equal to the ambient light plus a factor delta is determined and stored. If the value is not greater than the ambient light, then the threshold is adjusted to be equal to ambient light plus delta which again is a stored predetermined threshold value. In this manner, the amount of light is varied directly in accordance with ambient light so that there is enough of a difference in threshold between ambient light and light with the LED activated so that one can assure that the sensor will always operate to determine the fact that paper is present between the phototransistor and the LED.

As one can ascertain, depending on where the printer is situated, ambient light can result in a tremendous difference in phototransistor resistance and hence effect the ability of the printer to respond to various quality and grades of paper. In this particular setup using the MCU 80, one dynamically adjusts the threshold values according to the intensity of ambient light for each and every condition and before each and every paper or envelope load cycle. Hence, this value is always optimized during all modes of operations eliminating the need for potentiometers or other adjustable devices which are utilized in the prior art to accomplish similar results.

What is claimed is:

1. Apparatus for selectively feeding paper or envelopes to a printer or copier, said printer or copier having an input area for receiving a sheet of paper or an envelope, comprising:
a plurality of storage trays each adapted to store paper;
paper drive means for directing a sheet of paper as selected from any of such storage trays to said input area along a predetermined paper path, said paper drive means including a first drive and a second drive motor each operative as controlled to direct said sheet of paper along said path;
sensing means disposed along said path and operative to sense the position of said paper sheet along said path with said sensing means operative to sense the leading edge of said paper sheet in a first position to provide a first signal and to sense the trailing edge of said paper sheet to provide a second signal;
control means coupled to said first and said second drive motors and said sensing means;
first means coupled to said first drive motor and operative to drive said sheet to said first position and to drive the leading edge of said sheet to a second position in response to a first control signal from said control means, which first control signal is generated in response to said first signal being coupled to said control means;
second means coupled to said second drive motor to cause said sheet to continue to move along said path after the leading edge has arrived at the second position;
and said second drive motor to continue to operate for a predetermined period indicative of said paper sheet being positioned at said input area in response to a second control signal from said control means, which second control signal is generated in response to said second signal being coupled to said control means.

2. The apparatus according to claim 1, wherein said control means includes a microprocessor operative to provide control signals for operating said first and second motors during predetermined time intervals as computed by said microprocessor and indicative of a movement of said paper predetermined distances along said path.

3. The apparatus according to claim 2, wherein said microprocessor includes output ports and said control means further comprises means coupling said output ports to said sensing means and means to enable said microprocessor to activate said sensing means prior to said leading edge arriving at said first position to determine an operating threshold for said sensing means according to an ambient condition.

4. The apparatus according to claim 3, wherein said sensing means comprises a light emitting device operative when energized to provide an output light beam directed towards a light variable resistance element with said light emitting device and said variable resistance element positioned apart from one another and spaced to allow said paper sheet to pass therebetween when traversing said path, whereby a sheet will block light in said first position indicative of a first resistance value and pass light prior to arriving there at indicative of a second resistance value.

5. The apparatus according to claim 4, wherein said light emitting device is a light emitting diode, with said light variable resistance element being a phototransistor.

6. The apparatus according to claim 2, further including temperature sensing means coupled to one of said first or second drive motors and operative to monitor the temperature of said associated motor, with said temperature sensing means coupled to input ports of said microprocessor to enable said microprocessor to process said temperature as monitored and to provide a error signal if such temperature exceeds a predetermined value.

7. The apparatus according to claim 2, further including switching means associated with each of said trays and operative to provide an output during the absence of paper from said trays, said switching means coupled to microprocessor inputs to enable such microprocessor to provide an inhibit signal when paper is not present in any one selected tray.

8. The apparatus according to claim 2, further including activatable paper grasping means positioned along said path and operative when activated to grasp said paper sheet to cause said sheet to buckle a predetermined amount to compensate for any skew which may occur when said sheet is directed along said path, and means coupling said grasping means to said microprocessor for activating the same according to control by said microprocessor.

9. The apparatus according to claim 2, further comprising a storage tray adapted to store envelopes.

10. The apparatus according to claim 9, wherein said second drive motor as coupled to said microprocessor is controlled to direct an envelope from said envelope storage tray during an envelope load made with said microprocessor operating said second drive motor during predetermined periods to direct said envelope along a second path and second sensing means associated with said second path and coupled to said microprocessor to sense the position of said envelope along said second path to enable said microprocessor to control said second motor until said envelope is at said input area.

11. The apparatus according to claim 10, wherein said second sensing means associated with said second path includes a light emitting device coupled to said microprocessor and a light responsive variable resistance device positioned to receive said emitted light, with said devices spaced apart along said second path to allow envelopes to pass between them and operative to block said light from passing therebetween when coming toward said input area and to allow said light to pass therebetween when positioned at said input area.

12. The apparatus according to claim 1, wherein said microprocessor operates to activate said light source prior to implementing an envelope load mode to set a threshold for said second sensing means according to an ambient condition, whereby said threshold level for said second sensing means is a adjusted prior to an envelope feed mode.

13. The apparatus of claim 1 wherein:
the sensing means comprises a means for emitting light which is coupled to the control means and a means for detecting light which is coupled to the control means and which is spaced apart from the emitter means; and
the control means further comprises:
(a) means for determining a first detector signal output from the detector means when the emitter means is not emitting;
(b) means for energizing the emitter means to emit light and for determining a second detector signal output from the detector means in response to the light emitted by the emitter means; and
(c) means for comparing the first and second detector signal outputs to determine a threshold for use in determining the presence of paper in the paper path.

14. An apparatus for use with a printer or copier, said printer or copier capable of receiving and transmitting control signals indicative of the state of said printer or copier as capable of defining the status of said printer or copier as including a busy state when printing, and an idle state when not printing, said printer or copier including a slot for receiving a sheet of paper or an envelope and sensor means for providing a signal when said paper or envelope is received, said apparatus comprising:
first and second paper storage trays, each operative to hold paper;
first means coupled to said storage trays and operative to select a sheet of paper from either one of said trays upon application of a control signal to said first means;
paper path means for directing a selected sheet of paper to said slot along a given path, said apparatus including a microprocessor for controlling the selection of said sheet of paper and operative to control said paper path means to transport said selected sheet of paper to said slot, in combination therewith of means for coupling said printer or copier to said apparatus comprising:
bi-directional data transfer means coupled to said printer or copier and said microprocessor and operative in a first mode for transmitting said control signals from such printer or copier to said microprocessor and operative in a second mode for providing signals from said microprocessor to said printer or copier and means coupled to said data transfer means to operate the same in said first or second modes.

15. The apparatus according to claim 14, wherein in said first mode said printer or copier provides control signals via said bidirectional data transfer means indicative of an idle state, and means responsive to said idle state to enable said apparatus to load paper.

16. The apparatus according to claim 14, wherein in said second mode said microprocessor transmits a status signal to said printer or copier indicative of the status of said apparatus as to whether paper can be loaded.

17. Apparatus for selectively feeding paper or envelopes to a printer or copier, said printer or copier having an input area for receiving a sheet of paper or an envelope, comprising:
a plurality of storage trays each adapted to store paper;
paper drive means for directing a sheet of paper as selected from any of such storage trays to said input area along a predetermined paper path, said paper drive means including a first drive and a second drive motor each operative as controlled to direct said sheet of paper along said path;
sensing means disposed along said path and operative to sense the position of said paper sheet along said path with said sensing means operative to sense the leading edge of said paper sheet in a first position to provide a first signal and to sense the trailing edge of said paper sheet to provide a second signal;
control means coupled to said paper drive means and said sensing means;
said paper drive means, including said first drive motor, being operative to drive said sheet to said first position;
said paper drive means, including said first drive motor, being operative to drive the leading edge of said sheet for a first predetermined period in response to a first control signal from said control means which is generated by said control means in response to said first signal, whereby the leading edge is driven to a second position;
said paper drive means, including said second drive motor, being operative to drive said sheet further along said path in response to a further control signal from said control means which is generated by said control means after the first predetermined period; and
said paper drive means, including said second drive motor, being operative to at least assist in driving said sheet for a second predetermined period in response to a second control signal from said control means which is generated by said control means in response to said second signal, whereby said paper sheet has been fed into the printer or copier.

18. The apparatus of claim 17 wherein:
the sensing means comprises a means for emitting light which is coupled to the control means and a means for detecting light which is coupled to the control means and which is spaced apart from the emitter means; and
the control means further comprises:
(a) means for determining a first detector signal output from the detector means when the emitter means is not emitting;
(b) means for energizing the emitter means to emit light and for determining a second detector signal output from the detector means in response to the light emitted by the emitter means; and (c) means for comparing the first and second detector signal outputs to determine a threshold for use in determining the presence of paper in the paper path.

19. The apparatus of claim 18 wherein the emitter means comprises a light emitting diode.

20. The apparatus of claim 19 wherein the detector means comprises a phototransistor.

* * * * *

UNITED STATES PATENT AND TRADEMARK OFFICE
CERTIFICATE OF CORRECTION

PATENT NO. : 4,733,310

DATED : March 22, 1988

INVENTOR(S) : KAPP et al.

It is certified that error appears in the above-identified patent and that said Letters Patent is hereby corrected as shown below:

```
Column  2, line 55, after "printing", insert --at--.
Column 10, line  8, delete "resistive" and insert therefor
                    --resistor--.
Column 11, line 47-48, "20 C" should read --20C--.
           line 60, delete "state" and insert therefor
                    --stage--.
Column 14, line 16, delete "rest" and insert therefor
                    --reset--.
           line 23, delete "to" and insert therefor --and--.
           line 51, delete "drive" and insert therefor
                    --device--.
Column 15, line 56, "(SL1)" should read --(LS1)--.
Column 16, line 39, "MCu" should read --MCU--.
Column 17, line 18, "MCu" should read --MCU--.
           line 65, "MCu" should read --MCU--.
Column 18, line 33, "MCu" should read --MCU--.
Column 20, line  8, delete "30" (second occurrence), and insert
                    therefor --31--.
```

Signed and Sealed this

Second Day of August, 1988

Attest:

DONALD J. QUIGG

Attesting Officer      Commissioner of Patents and Trademarks